US011436736B2

(12) United States Patent
Oya

(10) Patent No.: US 11,436,736 B2
(45) Date of Patent: Sep. 6, 2022

(54) PATTERN EDGE DETECTION METHOD

(71) Applicant: TASMIT, INC., Yokohama (JP)

(72) Inventor: Masahiro Oya, Yokohama (JP)

(73) Assignee: TASMIT, INC., Yokohama (JP)

(*) Notice: Subject to any disclaimer, the term of this patent is extended or adjusted under 35 U.S.C. 154(b) by 157 days.

(21) Appl. No.: 17/040,533

(22) PCT Filed: Mar. 4, 2019

(86) PCT No.: PCT/JP2019/008345
§ 371 (c)(1),
(2) Date: Sep. 22, 2020

(87) PCT Pub. No.: WO2019/188009
PCT Pub. Date: Oct. 3, 2019

(65) Prior Publication Data
US 2021/0027473 A1 Jan. 28, 2021

(30) Foreign Application Priority Data
Mar. 27, 2018 (JP) .............................. JP2018-059802

(51) Int. Cl.
*G06K 9/00* (2022.01)
*G06T 7/13* (2017.01)
(Continued)

(52) U.S. Cl.
CPC ........... *G06T 7/13* (2017.01); *G01N 23/2251* (2013.01); *G06K 9/628* (2013.01); *G06K 9/6256* (2013.01);
(Continued)

(58) Field of Classification Search
CPC . G06T 7/13; G06T 7/001; G06T 2207/10061; G06T 2207/20081;
(Continued)

(56) References Cited

U.S. PATENT DOCUMENTS 5,475,766 A * 12/1995 Tsuchiya ................. G06T 7/001
382/199
5,563,702 A 10/1996 Emery et al.
(Continued)

FOREIGN PATENT DOCUMENTS

JP 4-125779 A 4/1992
JP 5-046764 A 2/1993
(Continued)

OTHER PUBLICATIONS

International Patent Application No. PCT/JP2019/008345; International Search Report and Written Opinion dated May 21, 2019, 9 pgs.

*Primary Examiner* — Samir A Ahmed
(74) *Attorney, Agent, or Firm* — Lathrop GPM LLP

(57) ABSTRACT

The present invention relates to a pattern edge detection method applicable to a semiconductor inspection apparatus that performs a pattern inspection using pattern design data. This method includes: generating an image of a pattern; detecting an edge of the pattern on the image based on a reference pattern generated from design data for the pattern; repeating generating of an image of a pattern and detecting of an edge of the pattern on the image to produce training-data candidates including a plurality of images and corresponding pattern edges; determining training data by removing pattern edges and corresponding images from the training-data candidates, the pattern edges to be removed being pattern edges satisfying a predetermined disqualification condition; producing an edge detection model by machine learning using the training data; generating an image of other pattern; and detecting an edge of the other pattern on the image using the edge detection model.

7 Claims, 25 Drawing Sheets

(51) Int. Cl.
  *G01N 23/2251* (2018.01)
  *G06K 9/62* (2022.01)
  *G06T 7/00* (2017.01)

(52) U.S. Cl.
  CPC .......... *G06T 7/001* (2013.01); *G01N 2223/07* (2013.01); *G01N 2223/401* (2013.01); *G01N 2223/507* (2013.01); *G01N 2223/6116* (2013.01); *G06T 2207/10061* (2013.01); *G06T 2207/20081* (2013.01); *G06T 2207/30148* (2013.01)

(58) Field of Classification Search
  CPC ........ G06T 2207/30148; G06T 7/0004; G01N 23/2251; G01N 2223/07; G01N 2223/401; G01N 2223/507; G01N 2223/6116; G01N 21/88; G06K 9/6256; G06K 9/628; G06K 9/6272; G06V 10/44; G06V 10/40; G06N 20/00
  See application file for complete search history.

(56) References Cited

U.S. PATENT DOCUMENTS

| | | | |
|---|---|---|---|
| 2001/0012390 A1* | 8/2001 | Watanabe | G06T 7/0006 382/144 |
| 2007/0165938 A1* | 7/2007 | Matsumura | G01N 21/95607 382/144 |
| 2008/0130982 A1* | 6/2008 | Kitamura | G06T 7/001 382/144 |
| 2009/0238441 A1* | 9/2009 | Yamashita | G06T 7/001 382/144 |
| 2010/0158345 A1* | 6/2010 | Kitamura | G06T 7/13 382/145 |
| 2013/0234019 A1* | 9/2013 | Miyamoto | G02B 21/0016 250/306 |
| 2013/0336574 A1* | 12/2013 | Nasser-Ghodsi | G06T 7/001 382/145 |
| 2016/0154922 A1* | 6/2016 | Kuncha | G03F 7/70441 716/53 |
| 2018/0005363 A1* | 1/2018 | Nagatomo | G01B 15/00 |

FOREIGN PATENT DOCUMENTS

| | | |
|---|---|---|
| JP | 2001-175857 A | 6/2001 |
| JP | 2006-012069 A | 1/2006 |
| JP | 2013-058036 A | 3/2013 |

* cited by examiner

STEP 1: REMOVE PATTERN EDGES HAVING DEFECT AND THEIR IMAGES

STEP 2: REMOVE PATTERN EDGES THAT MAY NOT HAVE BEEN DETECTED CORRECTLY AND THEIR IMAGES

STEP 3: CLASSIFY PATTERN EDGES INTO PATTERN GROUPS ACCORDING TO PATTERN TYPE

STEP 4: REMOVE PATTERN EDGES AND IMAGES SUCH THAT THE NUMBERS OF PATTERN EDGES OF RESPECTIVE PATTERN GROUPS ARE EVEN

DESIGN DATA EXAMPLE 1

DESIGN DATA EXAMPLE 2

DESIGN DATA EXAMPLE 3

| ANGLE θ | CLASSIFICATION OF REFERENCE PATTERN |
|---|---|
| 315° ≦ θ < 360°<br>0° ≦ θ < 45° | RIGHT EDGE |
| 45° ≦ θ < 135° | UPPER EDGE |
| 135° ≦ θ < 225° | LEFT EDGE |
| 225° ≦ θ < 315° | LOWER EDGE |

PATTERN EDGE DETECTION METHOD

CROSS-REFERENCE TO RELATED APPLICATIONS

This application is a 35 U.S.C. § 371 filing of International Application No. PCT/JP2019/008345 filed Mar. 4, 2019, which claims the benefit of priority to Japanese Patent Application No. 2018-059802 filed Mar. 27, 2018, each of which is incorporated herein by reference in its entirety.

TECHNICAL FIELD

The present invention relates to a pattern edge detection method applicable to a semiconductor inspection apparatus that performs a pattern inspection using pattern design data.

BACKGROUND ART

An optical pattern inspection device, which uses a die-to-die comparison method, is used for wafer pattern inspection in a semiconductor integrated circuit manufacturing process, or for pattern inspection of a photomask for forming the pattern. The die-to-die comparison method is a method of detecting a defect by comparing an image of a semiconductor device called a die to be inspected with an image obtained from the same position of the semiconductor device in its neighboring die.

On the other hand, a method called die-to-database comparison is used to inspect a photomask called a reticle that does not entail a neighboring die. This method is such that mask data is converted into an image and this image is used as a substitute for the image of the neighboring die used in the die-to-die comparison method, so that the same inspection as described above is performed. The mask data is data obtained by correcting design data for a photomask (see, for example, Patent Document 1).

However, when the die-to-database comparison method is used for wafer inspection, a corner round of a pattern formed on a wafer is detected as a defect. In a photomask inspection, a smoothing filter is applied to an image, which has been converted from the mask data, to form a corner round so that the corner round is not detected as a defect. However, since the corner round formed by the smoothing filter is not the same as an actual corner round formed on the wafer, the actual corner round may be detected as a defect. It is possible to set an allowable amount of pattern deformation so as to ignore such a difference between the corner rounds. However, this may arise a problem that a minute defect existing at a location other than a corner cannot be detected.

Focusing on problems in semiconductor integrated circuit production, a defect that occurs repeatedly is regarded as more important than a random defect that is caused by dust or the like. Such a repetitive defect (or a systematic defect) is defined as a defect that is repeatedly generated in all dies on a wafer due to a photomask defect or the like. The repetitive defect cannot be detected by the die-to-die comparison because it occurs in both a die to be inspected and a neighboring die to be compared. Therefore, there is a need for wafer inspection with the die-to-database comparison method.

CITATION LIST

Patent Literature

Patent document 1: Patent document 1: U.S. Pat. No. 5,563,702

SUMMARY OF INVENTION

Technical Problem

In the die-to-database method, an image of a pattern formed on a wafer is generated and an inspection based on design data is performed on this image. Prior to this inspection, pattern edges are detected based on the design data. However, this edge detection may not be performed accurately, and an erroneous edge on the image may be detected or a detection failure may occur. The reason for this is that in the conventional method, an edge on an image is detected based on design data according to a fixed rule, but such a method based on the fixed rule may result in a failure in an appropriate edge detection due to a quality of an image or pattern deformation.

Therefore, the present invention provides a method capable of highly accurate edge detection using machine learning.

Solution to Problem

Machine learning is applied to an edge detection of a pattern. In this method, as training data for machine learning algorithm, images of patterns to be inspected and images of detected pattern edges are used. The method generates a model for detecting a pattern edge on an image, and uses this model to detect an edge of a pattern on an image to be actually inspected.

The processing by the machine learning is more accurate than the processing based on the conventional fixed rule, and can realize a redundancy to variety of data. Such training of the model of machine learning using the training data makes it possible to perform highly accurate and highly redundant processing on similar data to the training data. Therefore, the edge detection model generated by the machine learning is expected to be able to appropriately detect an edge of a pattern.

On the other hand, if the training data is not suitable for learning of the algorithm of machine learning, the accuracy of the edge detection model is lowered, and the accuracy of edge detection using such edge detection model is also lowered.

Cases where the training data is inappropriate for the learning are as follows.

Case 1.1 A pattern contains a defect. In this case, a pattern edge detected by the die-to-database method may not correspond to an actual pattern edge. Therefore, the pattern containing a defect should not be included in the training data.

Case 1.2 A pattern edge deformation is large, or amounts of pattern edge deformation are discontinuous. In this case, in a process of generating a pattern edge image included in the training data, there is a high possibility that the edge detection has failed or a wrong pattern edge that does not correspond to an edge has been detected.

Case 1.3 The number of pattern edges included in the training data is highly unbalanced for each of pattern types. In this case, an edge detection model generated using a small number of pattern edges may not be able to detect an edge accurately or precisely.

Further, since an edge detected by the machine learning is not associated with the design data, it is necessary to associate the detected edge with the design data. In this association process, in some cases, the association between the detected edge and the design data may not be performed correctly. This is referred to as case 2.1.

In an embodiment, there is provided a method of detecting an edge of a pattern, comprising: generating an image of a pattern; detecting an edge of the pattern on the image based on a reference pattern generated from design data for the pattern; repeating generating of an image of a pattern and detecting of an edge of the pattern on the image to produce training-data candidates including a plurality of images and corresponding pattern edges; determining training data by removing pattern edges and corresponding images from the training-data candidates, the pattern edges to be removed being pattern edges satisfying a predetermined disqualification condition; producing an edge detection model by machine learning using the training data; generating an image of other pattern; and detecting an edge of the other pattern on the image using the edge detection model.

The predetermined disqualification condition is that a pattern includes a defect.

The predetermined disqualification condition is that a bias inspection value of a pattern edge is larger than a preset upper limit or smaller than a preset lower limit, the bias inspection value being an index value indicative of magnitude and direction of a deviation of the pattern edge from an edge of a reference pattern generated from corresponding design data.

The predetermined disqualification condition is that an edge of a pattern is not detected correctly in producing of the training-data candidates.

The predetermined disqualification condition is that a bias inspection value of a pattern edge is out of a preset range, the bias inspection value being an index value indicative of magnitude and direction of a deviation of the pattern edge from an edge of a reference pattern generated from corresponding design data.

The predetermined disqualification condition is that a bias inspection value of a pattern edge varies discontinuously, the bias inspection value being an index value indicative of magnitude and direction of a deviation of the pattern edge from an edge of a reference pattern generated from corresponding design data.

The predetermined disqualification condition is that a bias inspection value of a pattern edge is out of a preset range and that the bias inspection value varies discontinuously, the bias inspection value being an index value indicative of magnitude and direction of a deviation of the pattern edge from an edge of a reference pattern generated from corresponding design data.

The method further comprises: classifying the plurality of images included in the training-data candidates into a plurality of image groups according to pattern type; and removing images from the training-data candidates such that the numbers of images belonging to the respective image groups are equal to each other.

In an embodiment, there is provided a method of detecting an edge of a pattern, comprising: generating an image of a pattern; detecting an edge of the pattern on the image based on a reference pattern generated from design data for the pattern; repeating generating of an image of a pattern and detecting of an edge of the pattern on the image to produce training data including a plurality of images and corresponding pattern edges; producing edge detection models by machine learning using the training data, wherein producing the edge detection modes by the machine learning comprises (i) dividing each of the pattern edges included in the training data into a plurality of edges according to edge attribute based on the design data, and (ii) producing the edge detection models respectively for the plurality of edges by the machine learning using the training data; generating an image of other pattern; and detecting an edge of the other pattern on the image using the edge detection models.

Detecting the edge of the other pattern on the image comprises: detecting edges of the other pattern on the image using the edge detection models, respectively; and associating the detected edges with design data of the other pattern.

According to the above-mentioned embodiments, the above cases 1.1, 1.2, 1.3 and 2.1 are improved. Specifically, the training data is improved, and as a result, the accuracy of pattern edge detection using the machine learning is improved.

DESCRIPTION OF EMBODIMENTS

Figure 1:
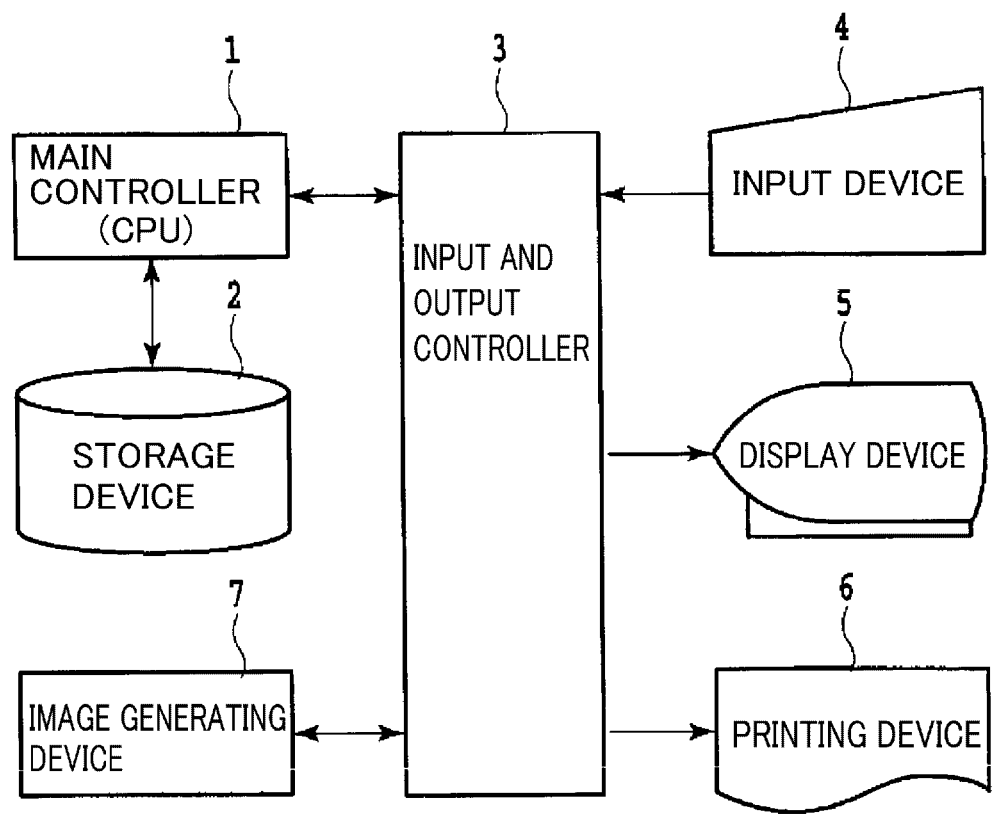
FIG. 1 is a schematic diagram showing an embodiment of a pattern inspection apparatus.

Embodiments of the present invention will now be described below with reference to the drawings. FIG. 1 is a schematic diagram showing an embodiment of a pattern inspection apparatus. The pattern inspection apparatus according to this embodiment includes a main controller 1, a storage device 2, an input and output controller 3, an input device 4, a display device 5, a printing device 6, and an image generating device 7.

The main controller 1 includes CPU (Central Processing Unit), and controls the entire apparatus as a whole. The storage device 2 is coupled to the main controller 1. The storage device 2 may be in the form of a hard disk, a solid state drive, a flexible disk, or an optical disk. The input device 4 (e.g., a keyboard and a mouse), the display device 5 (e.g., a display for displaying input data and calculation results), and the printing device 6 (e.g., printer) are coupled to the main controller 1 via the input and output controller 3.

The main controller 1 has an internal memory (internal storage device) storing a control program such as an OS (Operating System), a program for pattern edge detection, and required data, so that the main controller 1 performs the pattern edge detection and generation of an edge detection model according to the programs. These programs can be stored in a flexible disk, an optical disk, etc., and can be read into the memory, the hard disk, etc. before execution.

Figure 2:
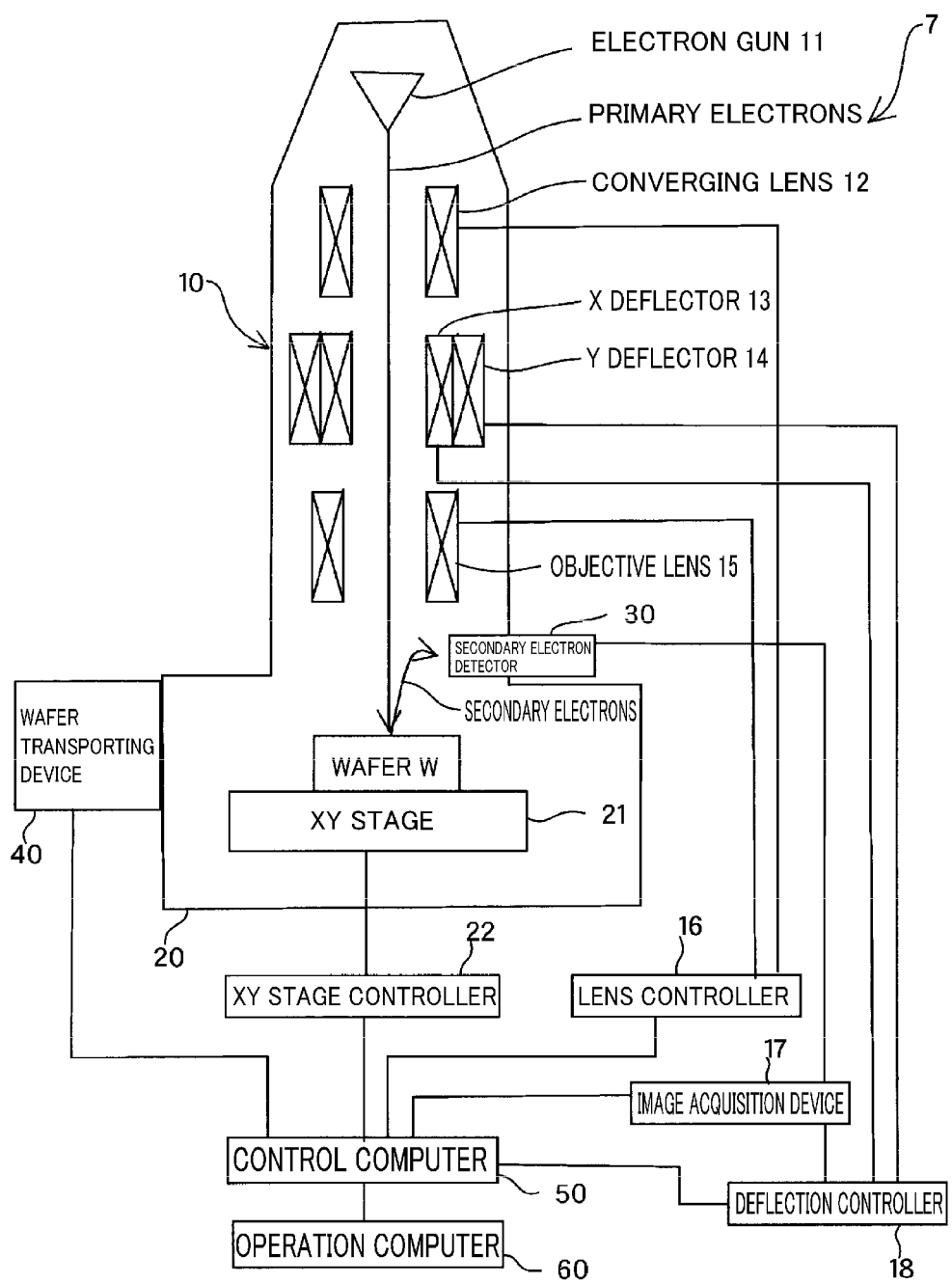
FIG. 2 is a schematic diagram showing an embodiment of an image generating device of the pattern inspection apparatus.

FIG. 2 is a schematic diagram showing an embodiment of the image generating device 7 of the pattern inspection apparatus. As shown in FIG. 2, the image generating device 7 includes an irradiation system 10, a specimen chamber 20, and a secondary electron detector 30. In this embodiment, the image generating device 7 is a scanning electron microscope.

The irradiation system 10 includes an electron gun 11, a converging lens 12 for converging primary electrons emitted by the electron gun 11, an X deflector 13 and a Y deflector 14 for deflecting an electron beam (i.e., a charged particle beam) in an X direction and a Y direction, and an objective lens 15. The specimen chamber 20 includes an XY stage 21 configured to be movable in the X direction and the Y direction. A wafer W, which is a specimen, is carried in and out of the specimen chamber 20 by a wafer transporting device 40.

In the irradiation system 10, the primary electrons emitted by the electron gun 11 converge in the converging lens 12, and are then deflected by the X deflector 13 and the Y deflector 14, while being focused by the objective lens 15 onto the surface of the wafer W as a specimen.

When the wafer W is irradiated with the primary electrons, secondary electrons are emitted from the wafer W, which are detected by the secondary electron detector 30. The converging lens 12 and the objective lens 15 are coupled to a lens controller 16, which is coupled to a control computer 50. The secondary electron detector 30 is coupled to an image acquisition device 17, which in turn is coupled to the control computer 50 as well. Intensities of the secondary electrons detected by the secondary electron detector 30 are converted into a voltage contrast image by the image acquisition device 17. An irradiation area of the primary electrons in which a maximum voltage contrast image with no distortion can be obtained is defined as a field of view.

The X deflector 13 and the Y deflector 14 are coupled to a deflection controller 18, which is also coupled to the control computer 50. The XY stage 21 is coupled to a XY stage controller 22, and this XY stage controller 22 is also coupled to the control computer 50. The wafer transporting device 40 is also coupled to the control computer 50 as well. The control computer 50 is coupled to an operation computer 60.

Figure 3:
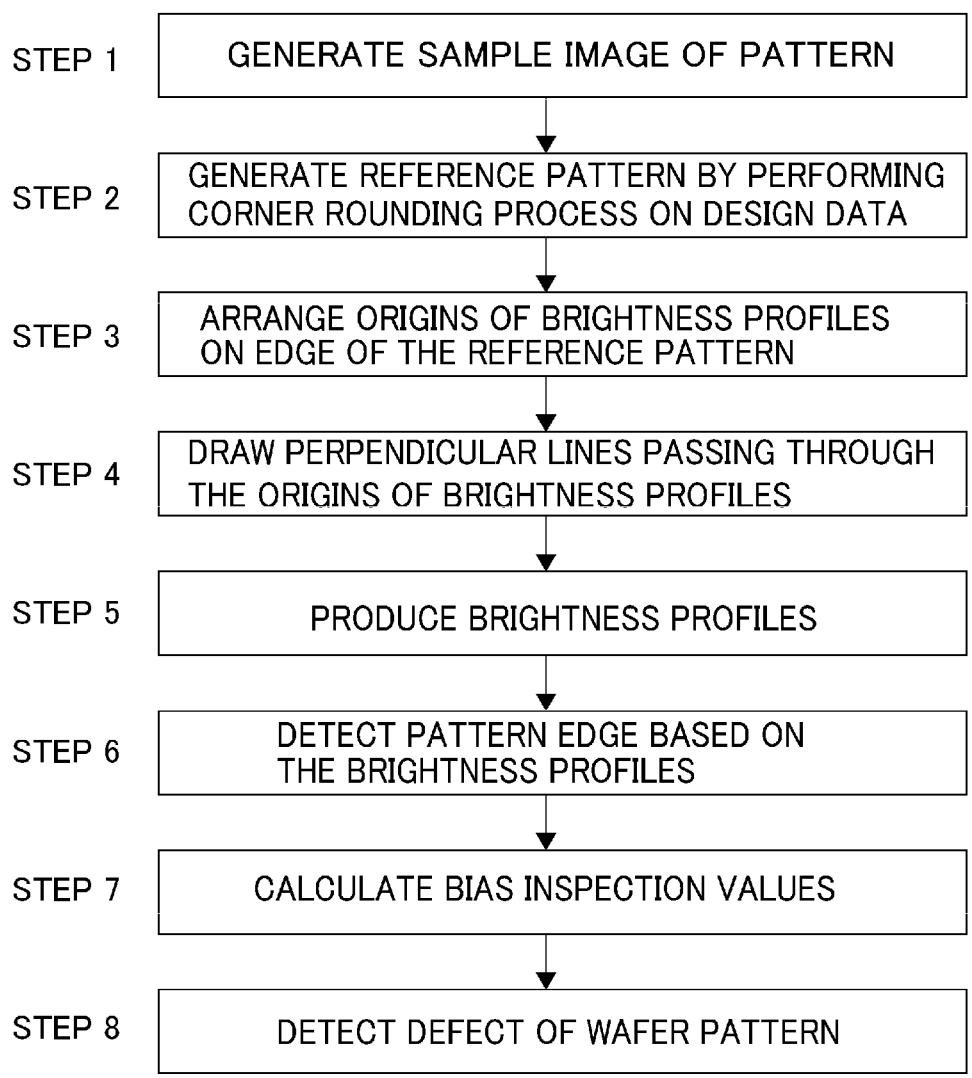
FIG. 3 is a flow chart of die-to-database inspection without using machine learning.

FIG. 3 is a flow chart of die-to-database inspection without using machine learning. The image generating device 7, constituted by a scanning electron microscope, generates a sample image of a pattern (step 1). In this embodiment, the pattern is formed on the surface of the wafer as a specimen. In the following descriptions, the pattern that is the target of edge detection may be referred to as wafer pattern.

Next, the main controller 1 shown in FIG. 1 performs a corner rounding process on a pattern of design data to generate a reference pattern (step 2). The corner rounding process may use, for example, a method of replacing a corner portion of the pattern of the design data with an arc. A radius value of the arc is designated as an inspection set value.

Figure 4:
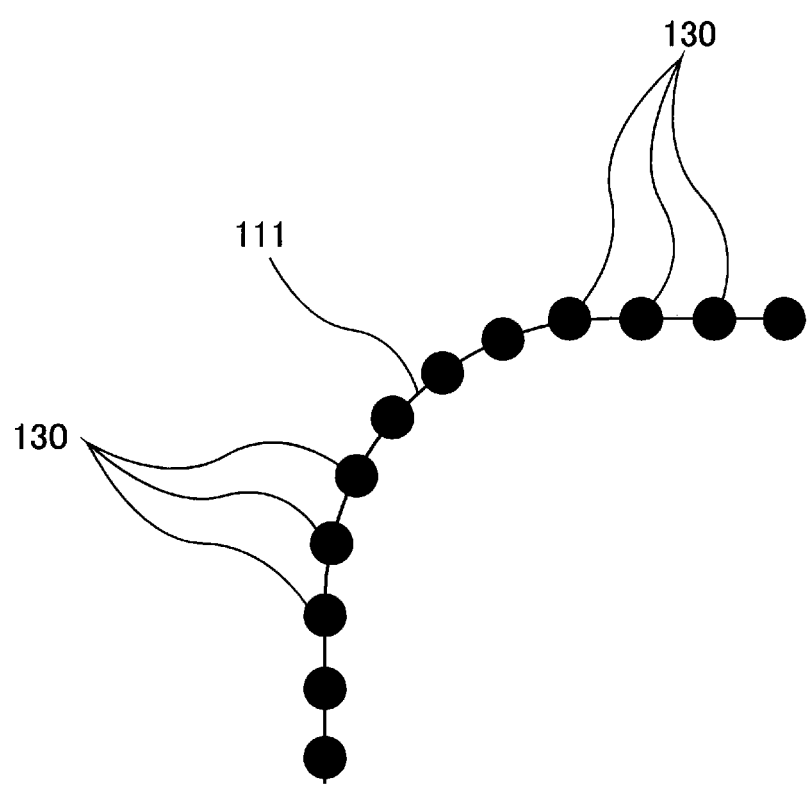
FIG. 4 is a diagram showing origins of brightness profiles arranged at equal intervals on an edge of a reference pattern produced from design data.

As shown in FIG. 4, the main controller 1 arranges origins 130 of brightness profiles at equal intervals on an edge of the reference pattern 111 generated in the step 2 (step 3 in FIG. 3). A distance between the adjacent origins 130 of brightness profiles is, for example, a distance corresponding to one pixel size.

Figure 5:
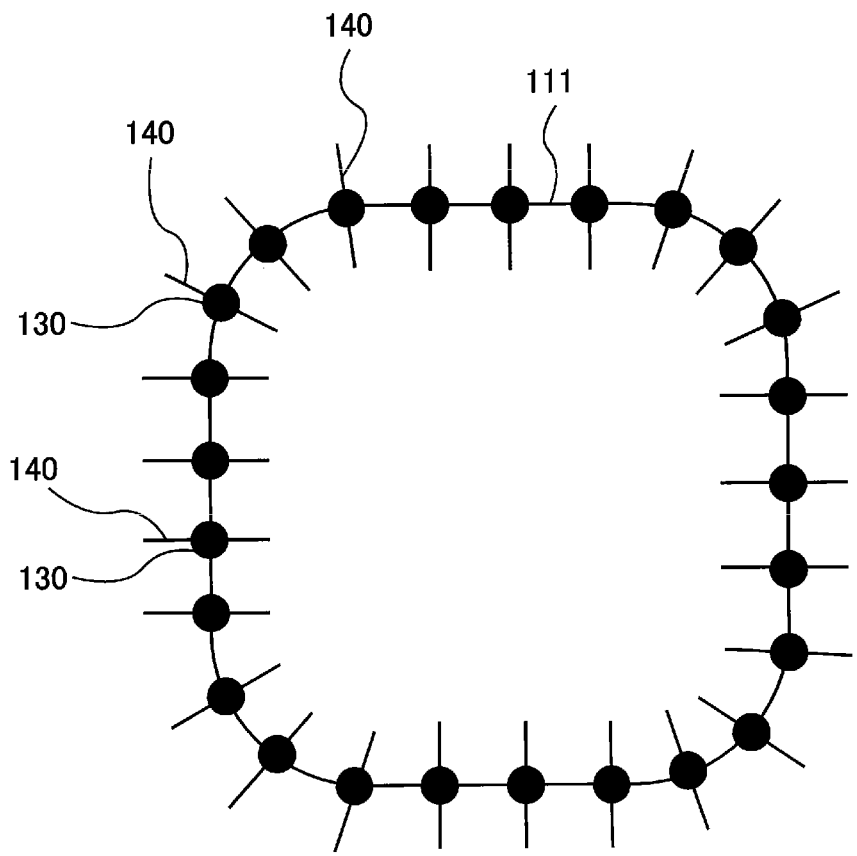
FIG. 5 is a diagram showing perpendicular lines passing through the origins of the brightness profiles.

As shown in FIG. 5, the main controller 1 draws perpendicular lines 140 passing through the origins 130 of the brightness profiles that have been arranged in the step 3 (step 4 in FIG. 3). The perpendicular lines are line segments perpendicular to the edge of the reference pattern 111, and are arranged at equal intervals. The main controller 1 obtains brightness values of the sample image on each perpendicular line 140, and produces a brightness profile of the sample image from these brightness values (step 5 in FIG. 3).

Figure 6:
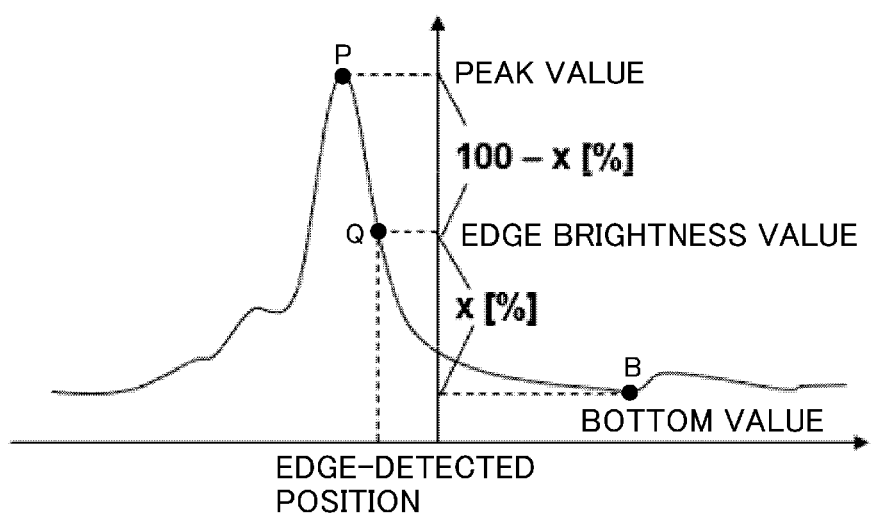
FIG. 6 is a graph showing an example of a brightness profile.

FIG. 6 is a graph showing an example of the brightness profile. In FIG. 6, vertical axis represents the brightness value, and horizontal axis represents position on the perpendicular line 140. The brightness profile represents a distribution of brightness values along the perpendicular line 140. The main controller 1 detects a pattern edge on the sample image based on the brightness profile (step 6 in FIG. 3). A threshold method, a linear approximation method, or the like is used for the pattern edge detection. In this embodiment, the pattern edge is detected using the threshold method.

The threshold method, which is one method of edge detection from the brightness profile, will be described with reference to FIG. 6. A threshold value is denoted by x [%]. The main controller 1 determines a sampling point P having the largest brightness value in the brightness profile, and designates a position of this sampling point as a peak point. Next, the main controller 1 determines a sampling point having the smallest brightness value in an outside-pattern area located more outwardly than the peak point P, and designates a position of this sampling point as a bottom point B. Next, the main controller 1 determines an edge brightness value that internally divides brightness values, ranging from a brightness value at the bottom point B to a brightness value at the peak point P, into x: (100−x). This edge brightness value is located between the brightness value at the peak point P and the brightness value at the bottom point B. The main controller 1 determines an edge-detected position located at a sampling point Q on the brightness profile having the determined edge brightness value.

Figure 7:
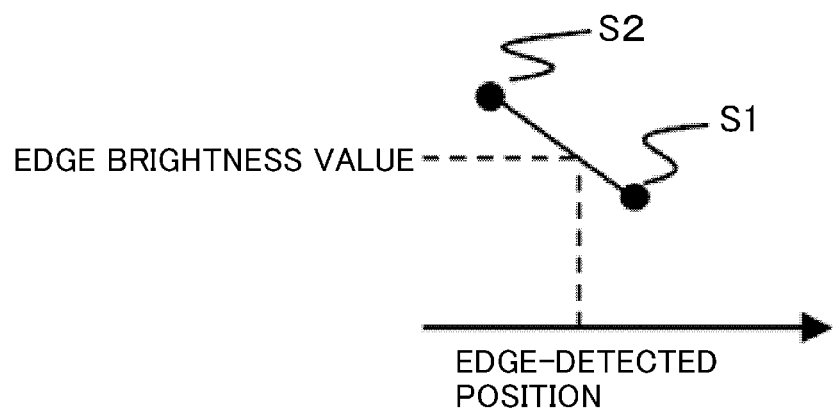
FIG. 7 is a diagram illustrating an embodiment of edge detection.

If the sampling point having the determined edge brightness value is not on the brightness profile, as shown in FIG. 7, the main controller 1 searches brightness values of sampling points from the peak point P toward the bottom point B, determines a sampling point S1 at which the brightness value falls below the edge brightness value for the first time, and determines a sampling point S2 which is a neighboring point of the sampling point S1 at the peak-point side. The main controller 1 then performs linear interpolation of the two sampling points S1, S2 to thereby determine an edge-detected position corresponding to the edge brightness value.

Figure 8:
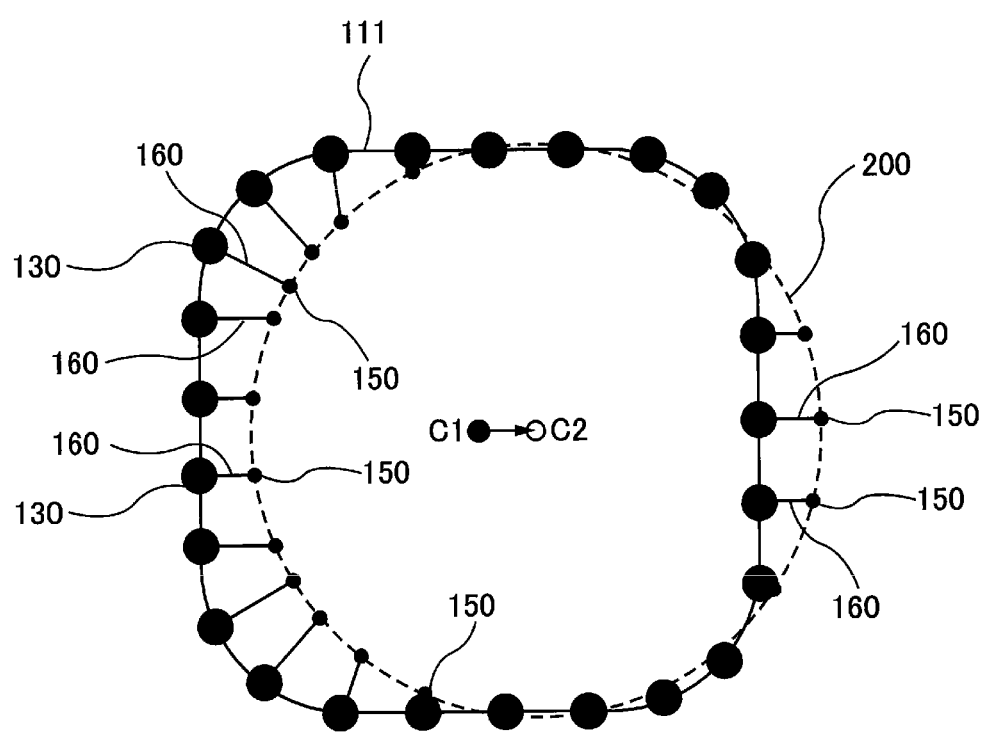
FIG. 8 is a diagram showing an edge formed by successively connecting edge-detected positions on respective brightness profiles.

As shown in FIG. 8, the main controller 1 sequentially connects edge-detected positions on respective brightness profiles with lines. In FIG. 8, reference numeral 150 denotes the above-described edge-detected position. Reference numeral 200 denotes a pattern edge, which is composed of a plurality of edge-detected positions 150 connected by dotted lines. In this manner, the main controller 1 can detect the pattern edge on the sample image based on the brightness profiles.

In FIG. 8, a line segment connecting the origin 130 of the brightness profile and the edge-detected position 150 is defined as a bias line 160. The main controller 1 calculates a bias inspection value which is defined as a length of a bias line 160 extending from the edge-detected position 150 located outwardly of the reference pattern 111. Further, the main controller 1 calculates a bias inspection value which is defined as a value obtained by multiplying a length of a bias line 160 extending from the edge-detected position 150 located inwardly of the reference pattern 111 by −1 (step 7 in FIG. 3). The bias inspection value is an index value indicating a magnitude and a direction of a deviation of the pattern edge from an edge of the reference pattern 111 produced from the corresponding design data.

In this way, the main controller 1 can distinguish "thickening deformation" and "thinning deformation" of the wafer pattern based on the bias inspection value. For example, a positive bias inspection value means that the wafer pattern is in a state of thickening deformation, and a negative bias inspection value means that the wafer pattern is in a state of thinning deformation. An upper limit and a lower limit may be predetermined for the bias inspection value. In this case, the main controller 1 can detect a thickening defect at which the bias inspection value exceeds the upper limit, and can also detect a thinning defect at which the bias inspection value is lower than the lower limit (step 8 in FIG. 3).

Figure 9:
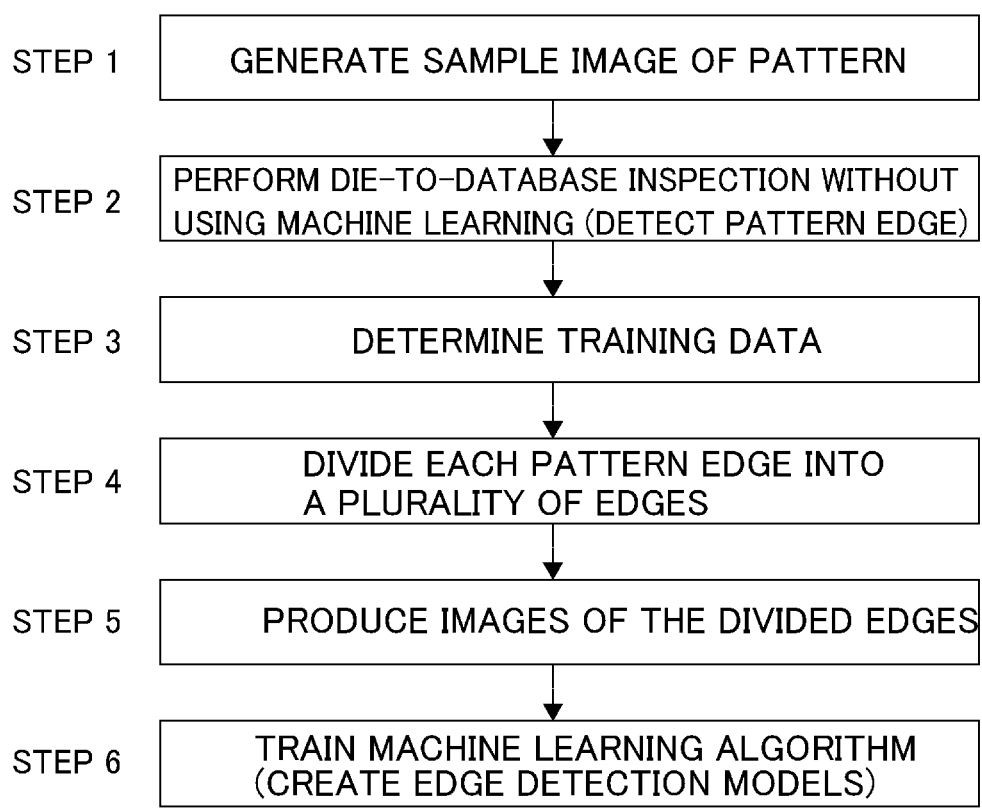
FIG. 9 is a flowchart for generating an edge detection model by machine learning.

FIG. 9 is a flowchart for generating an edge detection model by the machine learning. The generation of the edge detection model using the machine learning is performed by the main controller 1 shown in FIG. 1. The image generating device 7, constituted by a scanning electron microscope, generates a sample image of a pattern (step 1). The main controller 1 obtains the sample image from the image generating device 7. In this embodiment, the pattern is formed on the surface of the wafer which is a specimen. In the following descriptions, the pattern that is the target of edge detection may be referred to as wafer pattern.

In step 2, the pattern inspection apparatus shown in FIG. 1 performs the die-to-database inspection without using the machine learning according to the flowchart shown in FIG. 3. The steps 1 and 2 in FIG. 9 are repeated a plurality of times, so that generation of a sample image and detection of a pattern edge are repeated. As a result, a plurality of sample images and a plurality of corresponding pattern edges are obtained by the main controller 1. All of the sample images and the corresponding pattern edges obtained constitute training-data candidates.

Next, the main controller 1 determines training data to be used for the machine learning by excluding pattern edges, which satisfy predetermined disqualification conditions, and corresponding sample images from the training-data candidates (step 3). The training data is determined using the sample images and the pattern edge detection results. In the present embodiment, the disqualification conditions include (i) a pattern has a defect, and (ii) an edge of a pattern was not correctly detected in producing of the training-data candidates.

Figure 10:
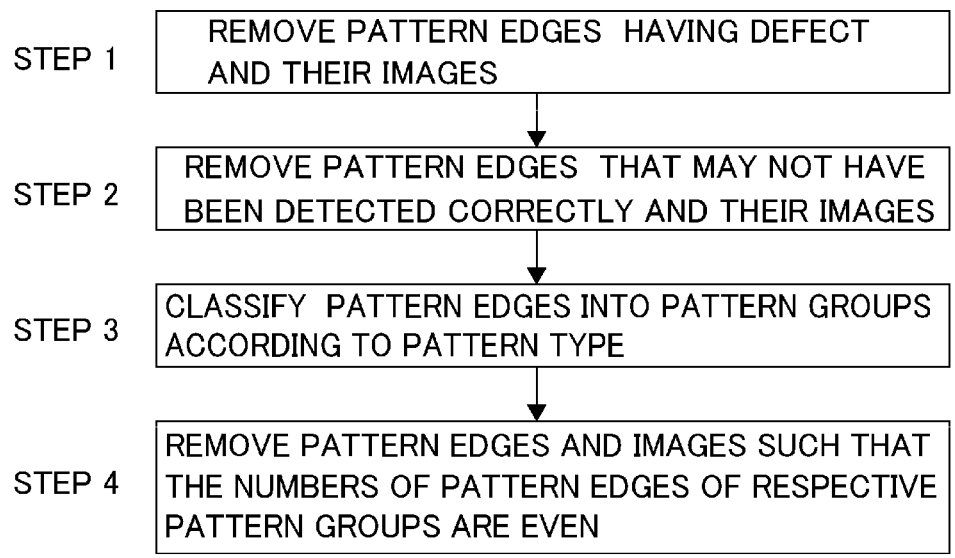
FIG. 10 is a flowchart illustrating determination of training data.

FIG. 10 is a flowchart for illustrating the determination of the training data in the step 3 of FIG. 9. In step 1 of FIG. 10, edges of patterns, each determined to have a defect in the die-to-database inspection, and corresponding sample images are removed from the training-data candidates. Specifically, edges of patterns whose bias inspection values are larger than the upper limit and corresponding sample images, and edges of patterns whose bias inspection values are smaller than the lower limit and corresponding sample images are removed from the training-data candidates.

In step 2 of FIG. 10, pattern edges that may not have been correctly detected in the die-to-database inspection and corresponding sample images are removed from the training-data candidates. An example of a pattern edge that may not have been detected correctly is a pattern edge with a large deformation. For determining the magnitude and direction of the deformation of the pattern edge, the bias inspection value used in the defect determination in the die-to-database inspection can be used. More specifically, a pattern edge whose bias inspection value is out of a preset range is determined to be a pattern edge with a large deformation. If the deformation of the pattern edge is large, the edge detection may not have been performed normally. Therefore, such pattern edge and corresponding sample image are removed from the training-data candidates.

Another example of the pattern edge in which the pattern edge detection may not have been correctly performed in the die-to-database inspection is a pattern edge whose bias inspection value varies discontinuously. The bias inspection value is an index value indicating the magnitude and direction of the deviation of the pattern edge from an edge of the reference pattern generated from the corresponding design data. Therefore, when the edge detection is not correctly performed, the bias inspection values are discontinuous, and as a result, the bias inspection values vary abruptly.

Figure 11:
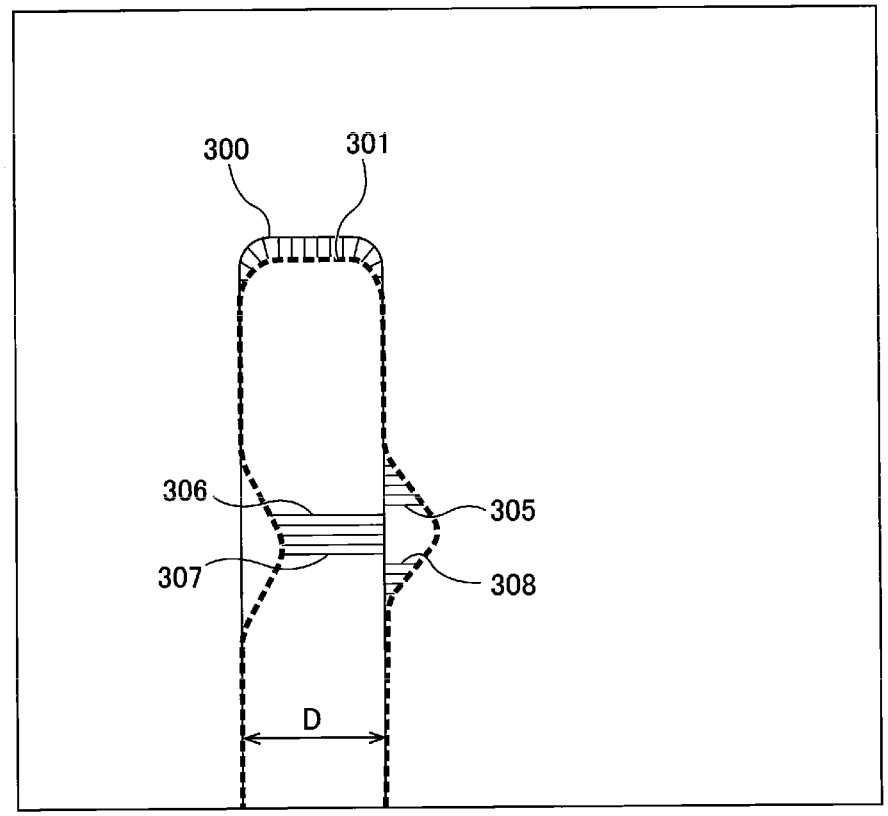
FIG. 11 is a diagram showing an example of a pattern in which bias inspection values are discontinuous due to erroneous detection of an edge.

FIG. 11 is a diagram showing an example of a pattern whose bias inspection values are discontinuous due to erroneous detection of an edge. Reference numeral 300 denotes a reference pattern generated from the design data, and reference numeral 301 denotes an actual wafer pattern produced based on the design data. The bias inspection value varies discontinuously along the edge of the reference pattern 300. Specifically, a bias inspection value indicated by a bias line 305 is positive, whereas a bias inspection value indicated by an adjacent bias line 306 is negative. Further, a bias inspection value indicated by a bias line 307 is negative, whereas a bias inspection value indicated by an adjacent bias line 308 is positive.

When the bias inspection values vary abruptly as in this example (e.g., when a difference between the bias inspection values of two adjacent bias lines is not less than a predetermined threshold value), the pattern edge and the corresponding sample image are removed from the training-data candidates. For example, when the difference between the bias inspection values of the two adjacent bias lines 305 and 306 in FIG. 11 is 30% or more of a width D of the reference pattern 300, the sample image is removed from the training-data candidates.

Figure 12:
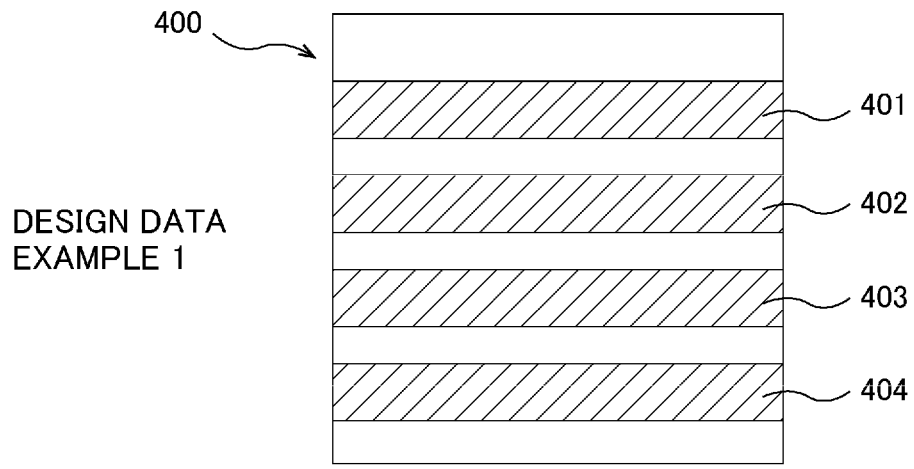
FIG. 12 is a diagram showing an example of design data.
Figure 12:
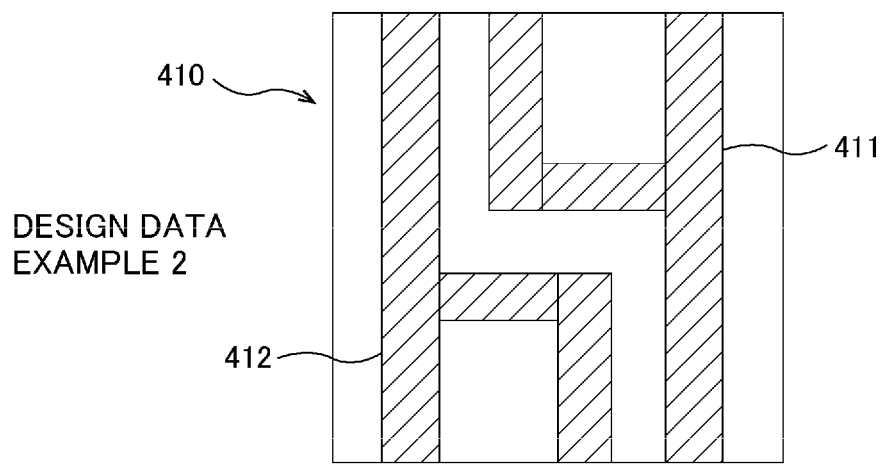
Figure 12:
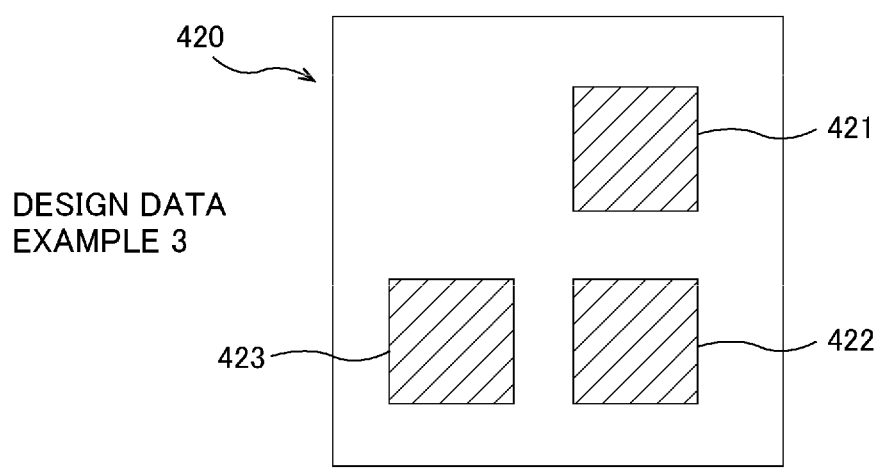

In step 3 of FIG. 10, a plurality of sample images included in the training-data candidates are classified into a plurality of image groups according to pattern type of the design data. FIG. 12 shows an example of design data and shows three types of patterns. Reference numerals 400, 410, and 420 represent design data used for classifying the sample images, reference numerals 401, 402, 403, and 404 represent patterns included in the design data 400, reference numerals 411 and 412 represent patterns included in the design data 410, and reference numerals 421, 422, and 423 represent patterns included in the design data 420.

Figure 13:
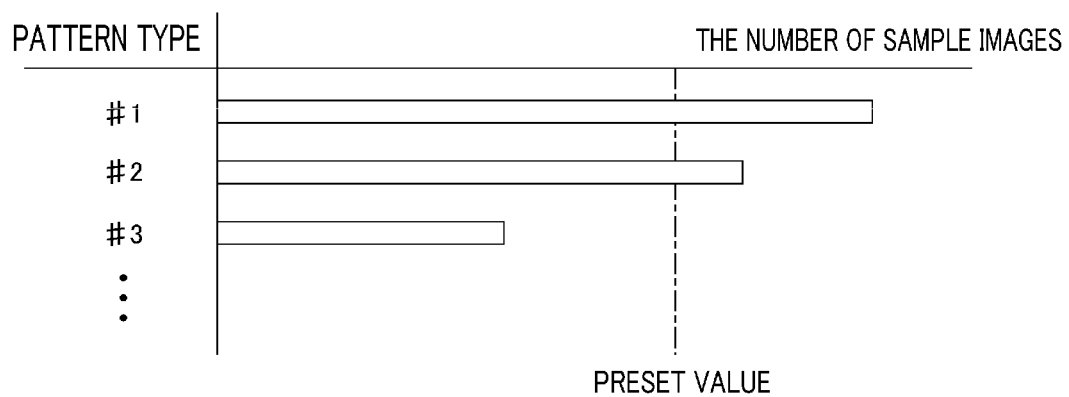
FIG. 13 is a histogram showing a result of classifying a plurality of sample images into a plurality of image groups according to type of pattern of design data.

FIG. 13 is a histogram showing the results of classifying the plurality of sample images, obtained from the die-to-database inspection, into a plurality of image groups according to the pattern type of design data. In FIG. 13, vertical axis represents pattern type of design data, and horizontal axis represents the number of sample images.

In step 4 of FIG. 10, the main controller 1 removes sample images from the training-data candidates such that the numbers of sample images belonging to the respective image groups classified are equal to each other. If there is a pattern type in which the number of sample images is less than a preset value, the main controller 1 attaches an alarm to the training data to notify a user that there is a pattern type in which the number of sample images is small.

Such operation can improve the accuracy of the machine learning by reducing unbalance of the pattern types (i.e., increasing the comprehensiveness of the pattern types used for the training data). Moreover, the total number of training data can be reduced by reducing the unbalance in the pattern types of the training data.

Returning back to FIG. 9, in step 4 of FIG. 9, the main controller 1 divides each of the plurality of pattern edges, included in the training data determined in the step 3 of FIG. 9, into a plurality of edges according to pattern edge direction of the design data. The pattern edge direction is an edge attribute based on the design data.

Figure 14:
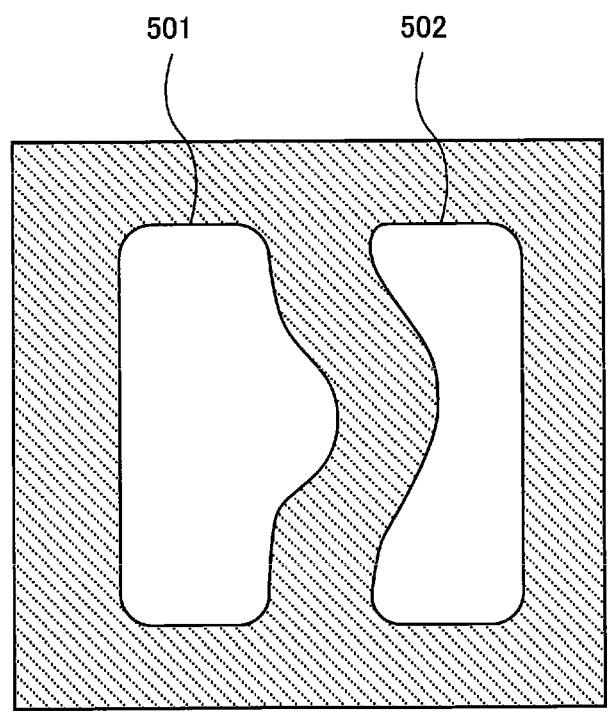
FIG. 14 is a diagram showing a sample image of a wafer pattern.
Figure 15:
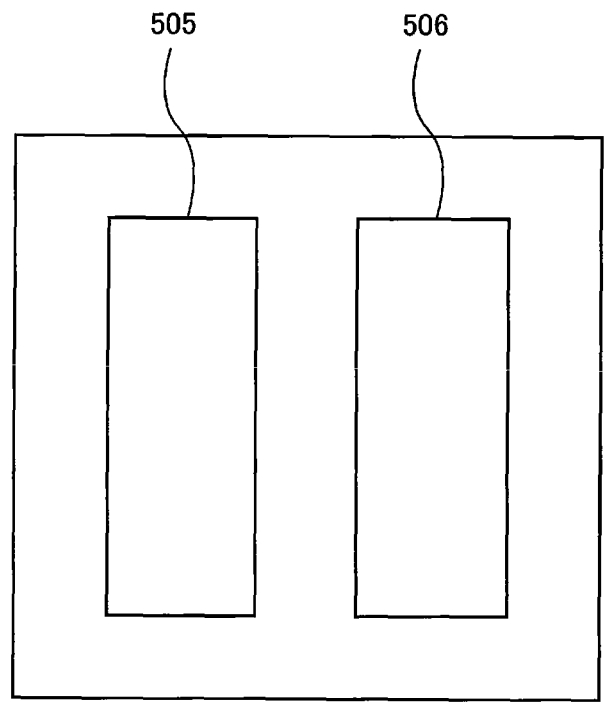
FIG. 15 is a diagram showing design data for the wafer pattern shown in FIG. 14.
Figure 16:
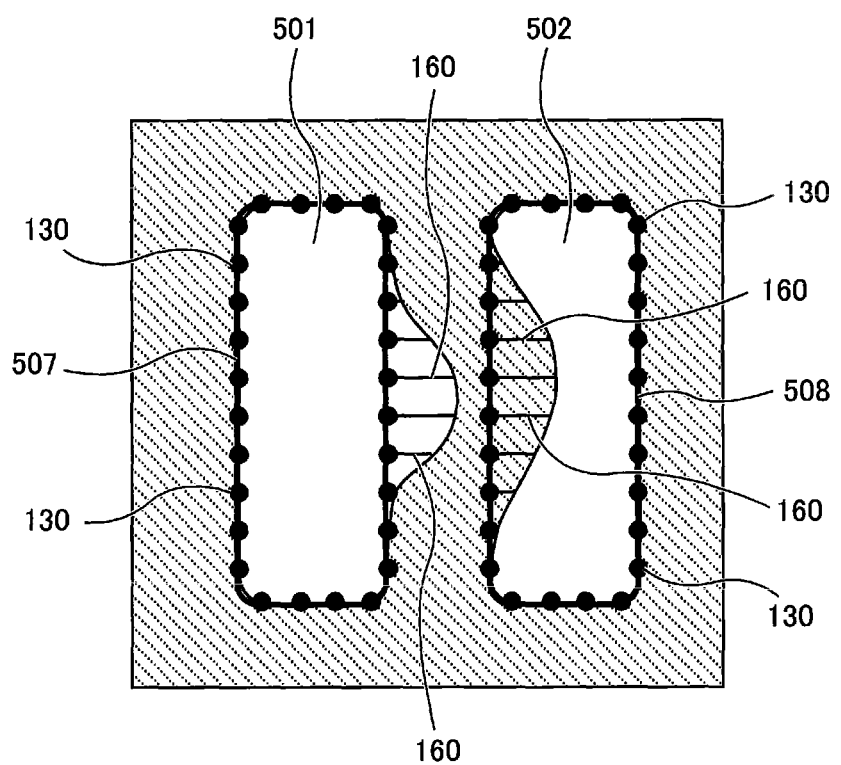
FIG. 16 is a diagram in which a wafer pattern is superimposed on a reference pattern generated by performing a corner rounding process on design data.

FIG. 14 is a diagram showing a sample image of wafer patterns 501 and 502, and FIG. 15 is a diagram showing design data 505 and 506 of the wafer patterns 501 and 502 shown in FIG. 14. FIG. 16 is a diagram in which the wafer patterns 501 and 502 are superimposed on reference patterns 507 and 508 which are generated by applying the corner rounding process to the design data 505 and 506. In FIG. 16, the origins 130 of the brightness profiles are arranged at equal intervals on the reference patterns 507 and 508, and the bias lines 160 extend from the origins 130 to the edge-detected positions.

Figure 17:
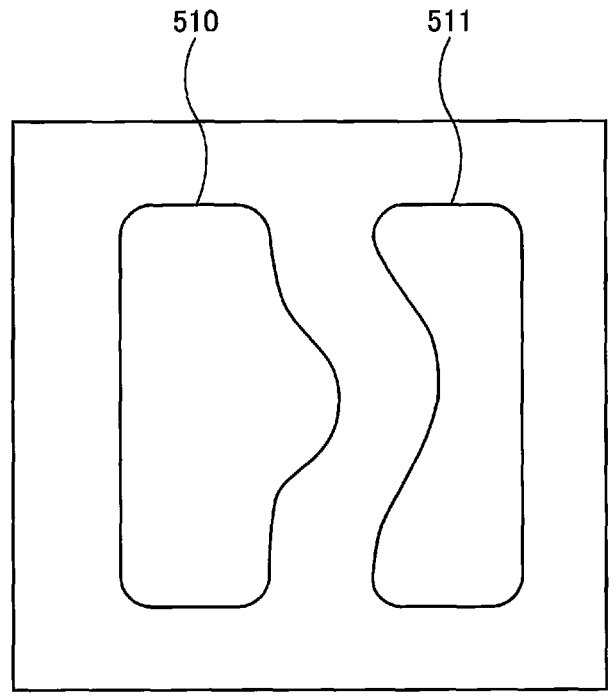
FIG. 17 is a diagram in which edge-detected positions are connected by lines to form a detected pattern edge.
Figure 18:
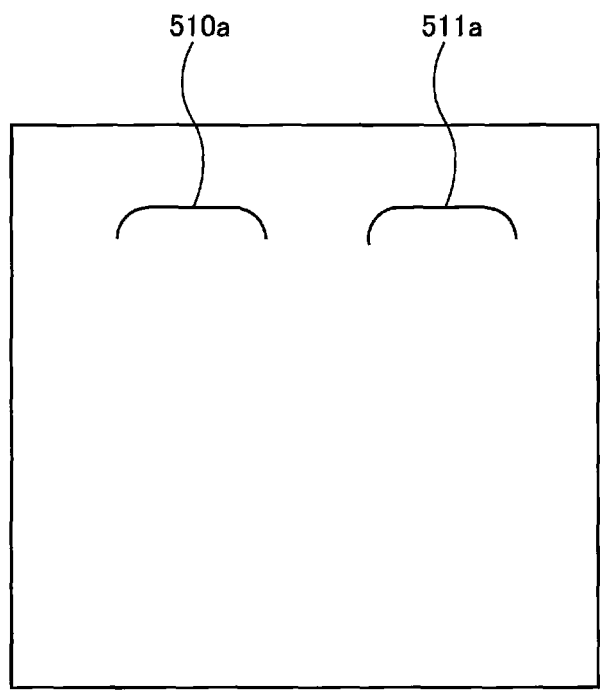
FIG. 18 is a diagram showing an upper edge separated from the pattern edge shown in FIG. 17.
Figure 19:
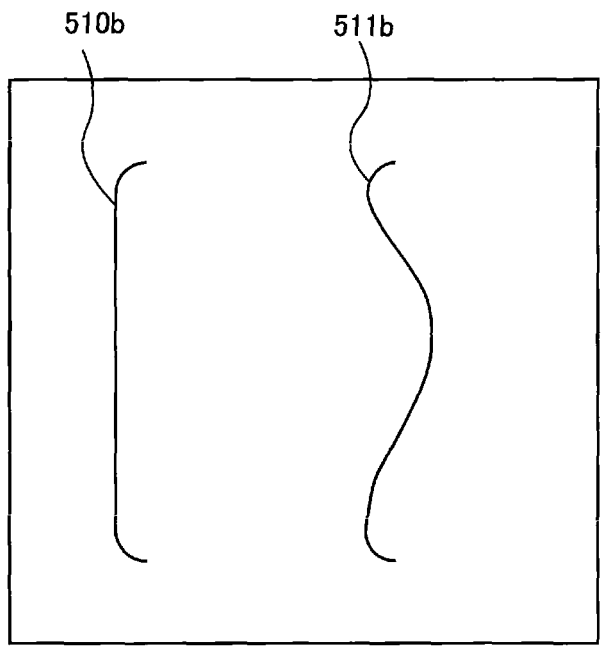
FIG. 19 is a diagram showing a left edge separated from the pattern edge shown in FIG. 17.
Figure 20:
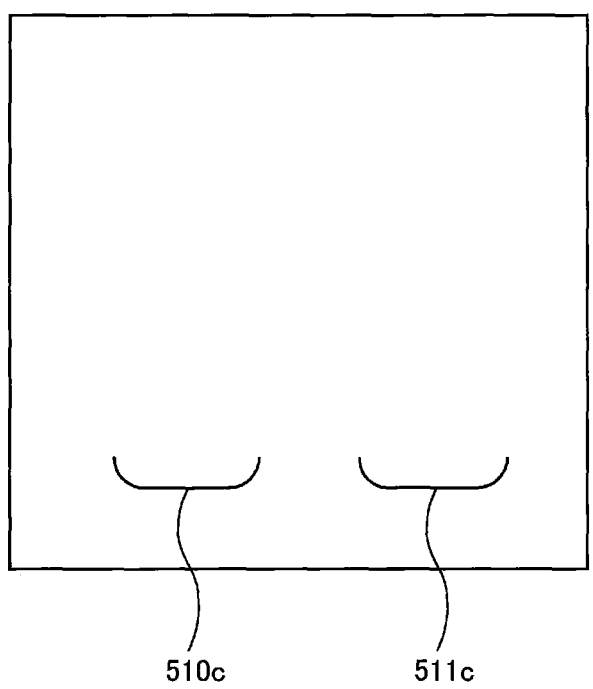
FIG. 20 is a diagram showing a lower edge separated from the pattern edge shown in FIG. 17.
Figure 21:
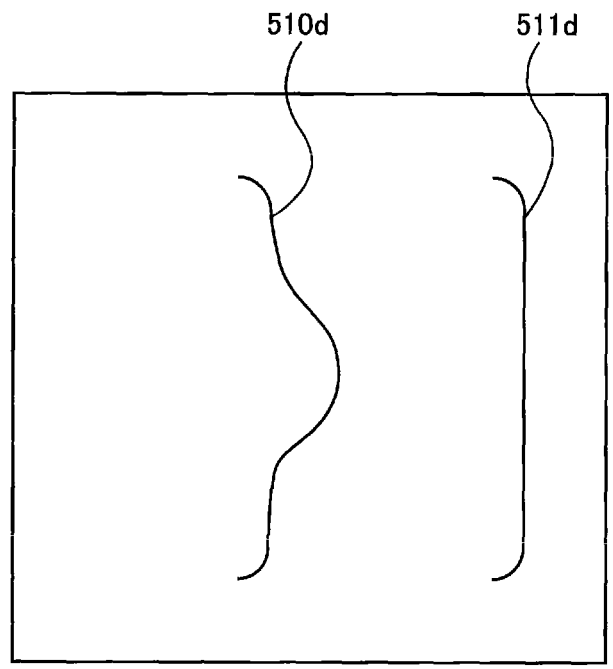
FIG. 21 is a diagram showing a right edge separated from the pattern edge shown in FIG. 17.

FIG. 17 is a diagram in which the edge-detected positions are connected by lines to form detected pattern edges 510 and 511. FIG. 18 is a diagram showing upper edges 510a and 511a separated from the pattern edges shown in FIG. 17, and FIG. 19 is a diagram showing left edges 510b and 511b separated from the pattern edges shown in FIG. 17. FIG. 20 is a diagram showing lower edges 510c and 511c separated from the pattern edges shown in FIG. 17, and FIG. 21 is a diagram showing right edges 510d and 511d separated from the pattern edges shown in FIG. 17.

Figure 22:
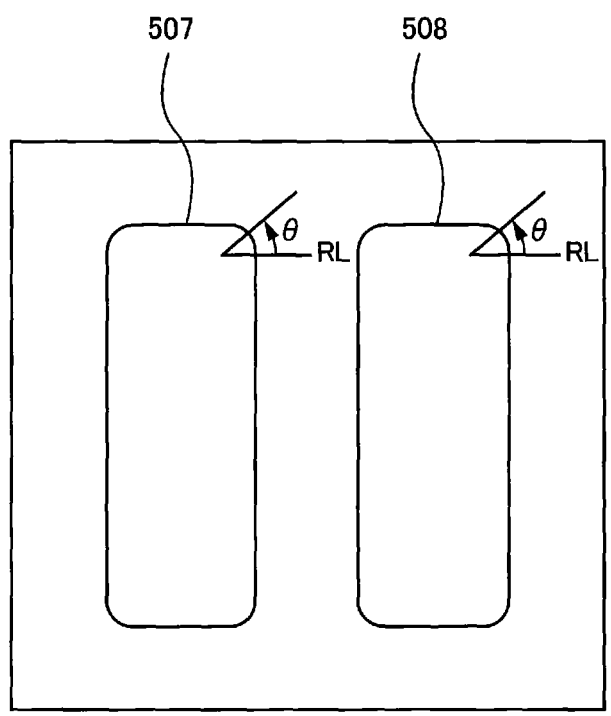
FIG. 22 is a diagram for explaining directions of the pattern edge.
Figures 23, 24:
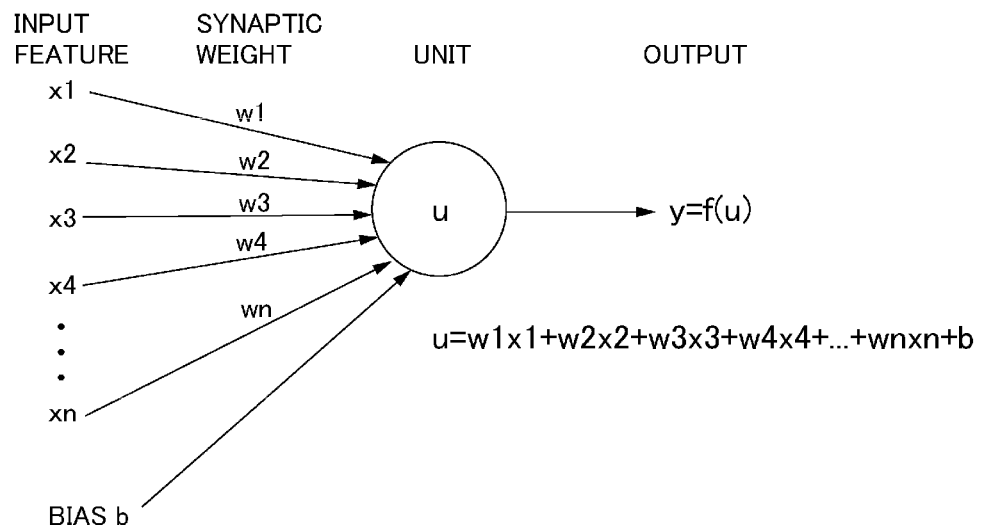
FIG. 23 is a table of reference pattern divided based on edge angles.
FIG. 24 is a diagram showing a structure of a perceptron forming a part of a feedforward neural network.

FIG. 22 is a diagram for explaining direction of the pattern edge. As shown in FIG. 22, the direction of the pattern edge is determined based on an edge angle $\theta$ of each of the reference patterns 507 and 508. The angle $\theta$ is defined as a counterclockwise angle from a reference line RL of a normal line extending from the inside to the outside of the pattern. FIG. 23 is a table for the reference patterns 507 and 508 classified based on the edge angle $\theta$. The pattern edges 510 and 511 detected based on the reference patterns 507 and 508 include the right edges 510d and 511d, the upper edges 510a and 511a, the left edges 510b and 511b, and the lower edges 510c and 511c, which are divided according to the angles $\theta$ of the reference patterns 507 and 508.

In step 5 of FIG. 9, the main controller 1 produces images of the divided edges. Further, in step 6 of FIG. 9, the main controller 1 uses the training data to train the machine learning algorithm for each of the plurality of divided edges, i.e., to produce a plurality of edge detection models by the machine learning. Hereinafter, a method using feedforward neural network as the machine learning algorithm will be described.

FIG. 24 is a diagram showing a structure of a perceptron forming a part of a feedforward neural network. There are synaptic weights $w_1, w_2, \ldots, w_n$ for an input vector (or input features, $x_1, x_2, \ldots, x_n$), respectively. Unit value u is expressed as $w_1 x_1 + w_2 x_2 + \ldots + w_n x_n + b$, which is the sum of products of the input features and the corresponding synaptic weights, and a bias term b. Output y of the perceptron is a value $y=f(u)$ obtained by inputting the unit value u into an activation function $f(\cdot)$.

Figure 25:
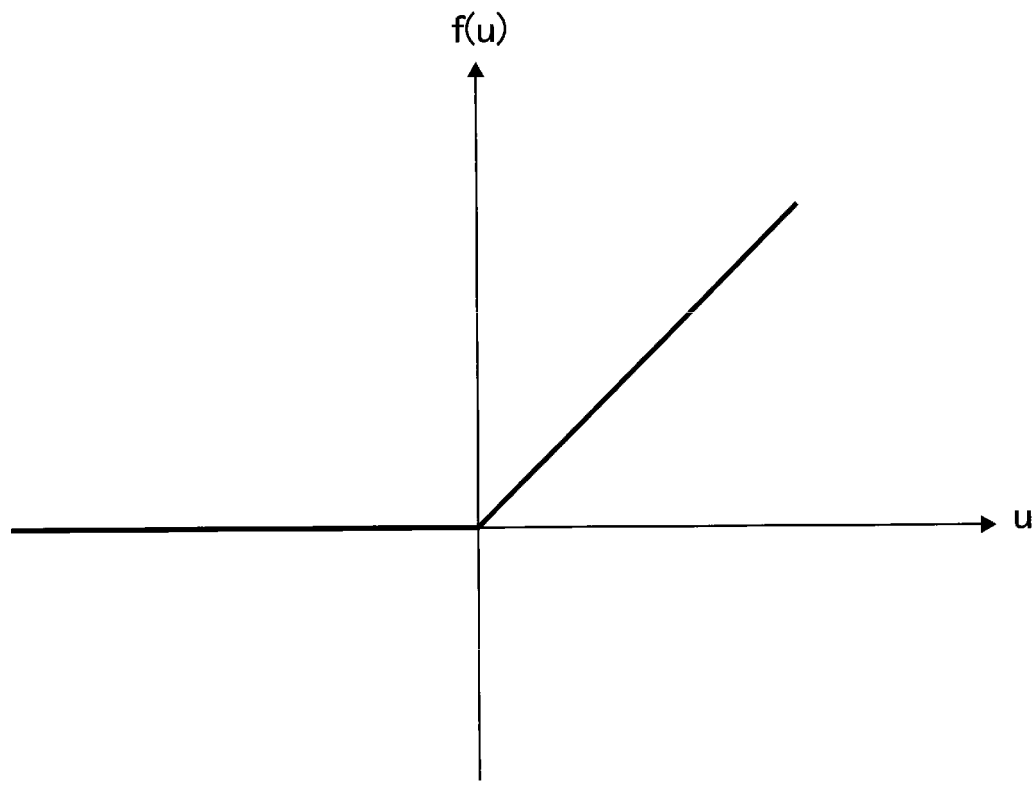
FIG. 25 is a diagram showing an activation function.

FIG. 25 is a diagram showing the activation function. In this embodiment, a ramp function (ReLU) is used as the activation function. The ramp function is defined as follows.

If $u<0, f(u)=0$; if $u \geq 0, f(u)=u$

Figure 26:
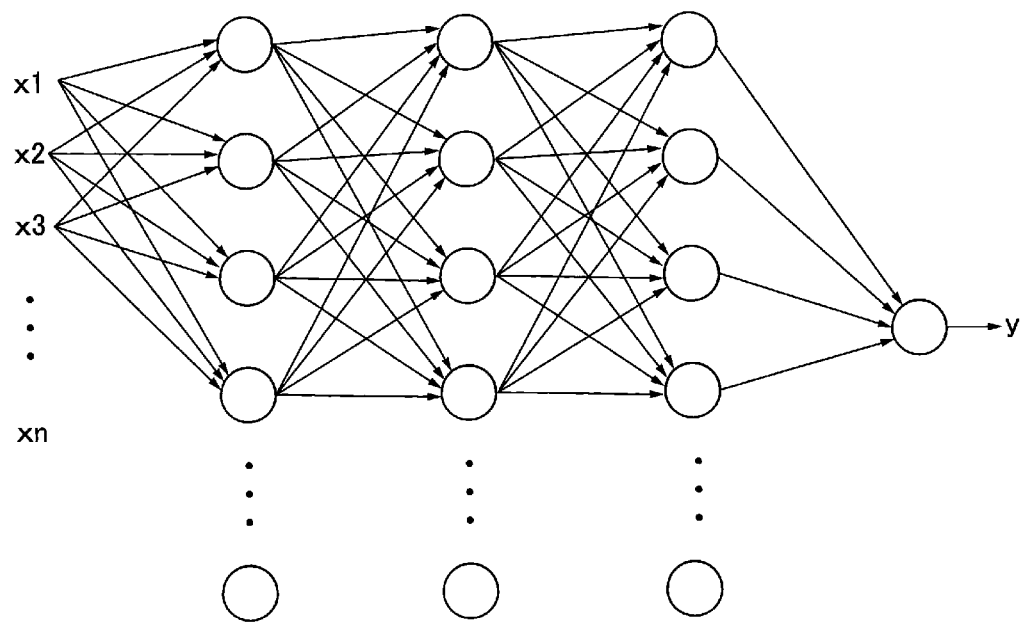
FIG. 26 is a diagram of a feedforward neural network with multilayered perceptrons.

FIG. 26 is a diagram of the feedforward neural network including multilayered perceptrons. In the feedforward neural network, there are multiple layers of perceptrons. An output of one perceptron is input to the next perceptron in a direction from an input-side layer to an output-side layer. The calculation is performed sequentially from the input-side layer and finally the output value y is calculated.

Figure 27:
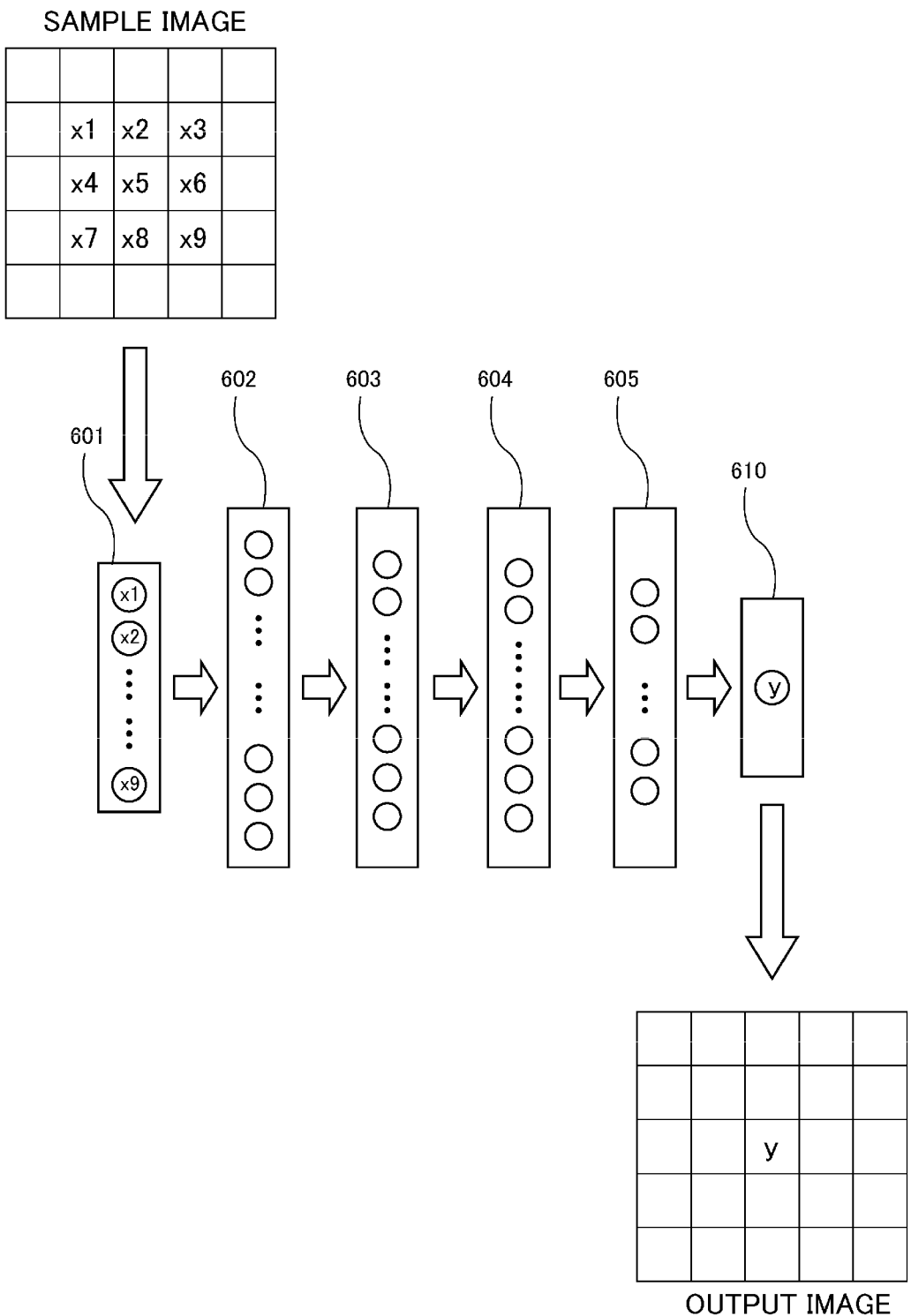
FIG. 27 is a conceptual diagram showing a process in which a plurality of brightness values that have been input to an input layer are converted into one brightness value by a feedforward neural network.

In the present embodiment, the input feature of the feedforward neural network is a brightness value of a pixel forming a sample image included in the training data. FIG. 27 is a conceptual diagram showing a manner in which a plurality of brightness values are input to an input layer and converted into one brightness value by the feedforward neural network. In the feedforward neural network shown in FIG. 27, brightness values of nine adjacent pixels of a sample image are input to an input layer 601, and a brightness value of one pixel located at the center of the nine pixels is output to an output layer 610. Specifically, the main controller 1 inputs brightness values x1 to x9 of the sample image, whose edge is to be detected, to the input layer 601. An image area constituted by a set number of pixels is called a patch. The brightness values x1 to x9 of the pixels in the patch of the sample image are sequentially propagated to units of intermediate layers 602 to 605 of the feedforward neural network, and finally the brightness value y is output from the output layer 610. This brightness value y is assigned to a brightness value of a pixel of an output image corresponding to the pixel located at the center of the patch of the sample image.

Figure 28:
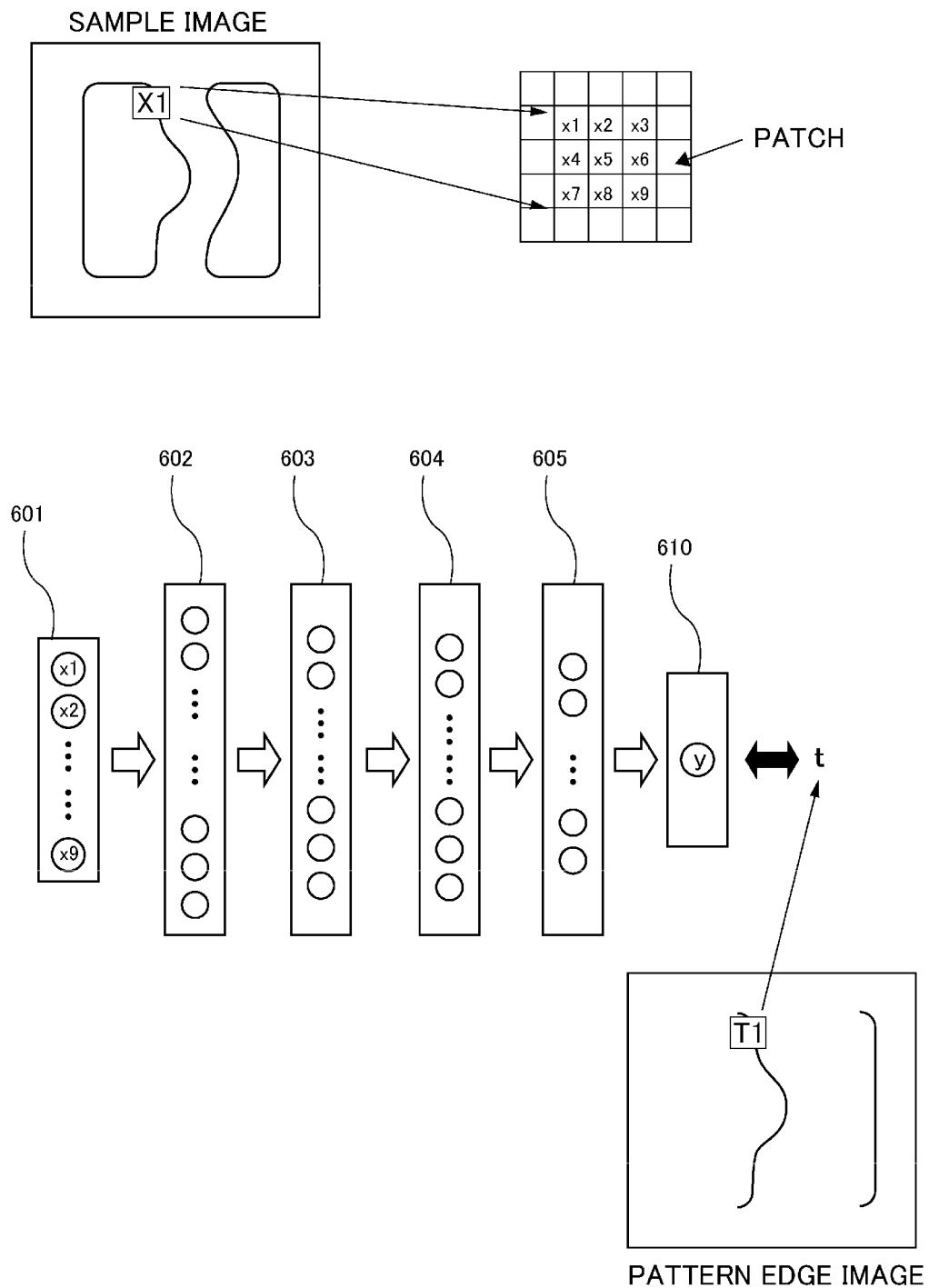
FIG. 28 is a conceptual diagram showing a process in which the feedforward neural network learns such that an output image coincides with an image of a corresponding pattern edge as a result of an input of a sample image included in training data.

FIG. 28 is a conceptual diagram showing a manner in which the feedforward neural network learns such that the output image coincides with an image of a corresponding pattern edge as a result of the input of the sample image included in the training data. In this specification, learning means that the main controller 1 automatically adjusts the synaptic weights for connecting the units of the feedforward neural network such that the output image coincides with an image of a corresponding pattern edge as a result of the input of the sample image. The edge detection model includes the adjusted synaptic weights. In the present embodiment, the sample image is used as a training image for the learning, and the image of the corresponding pattern edge is used as a training image for the learning.

In the present embodiment, the main controller 1 uses the training data to produce a plurality of edge detection models by the machine learning for a plurality of corresponding edges divided according to the edge attribute. Where X1 denotes a brightness vector of the patch extracted from the sample image, y denotes a brightness value of the patch X1 output from the feedforward neural network, and t denotes a brightness value of a patch T1 of the pattern edge image corresponding to the position of the patch X1, it is desirable that the brightness value y output from the feedforward neural network be as close to the brightness value t of the pattern edge image as possible.

Figure 29:
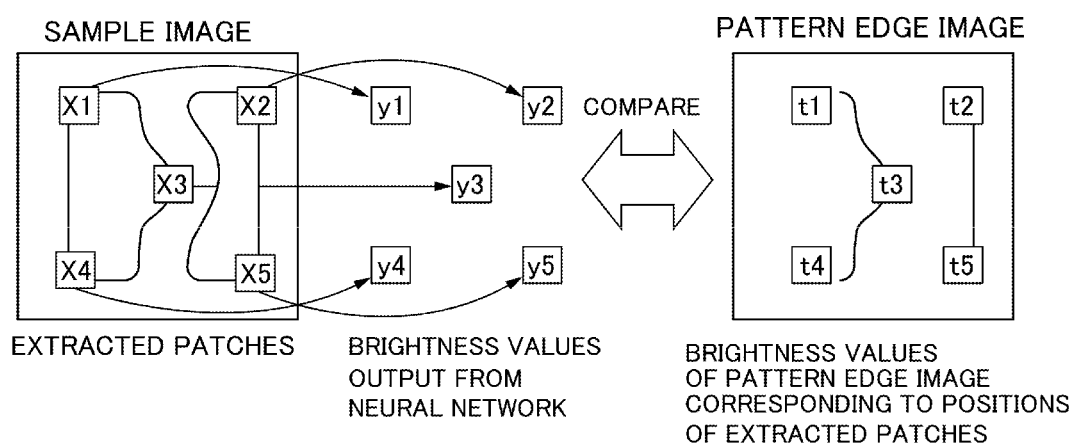
FIG. 29 a schematic diagram showing five patches extracted from the sample image, brightness values output from the feedforward neural network, and patches of a pattern edge image corresponding to respective positions of the patches extracted from the sample image.

FIG. 29 is a schematic diagram showing five patches extracted from the sample image, brightness values output from the feedforward neural network, and patches of the pattern edge image corresponding to respective positions of the patches extracted from the sample image. Brightness vectors X1, X2, . . . , X5 of the patches extracted from the sample image are converted into brightness values y1, y2, . . . , y5, respectively. The brightness values y1, y2, . . . , y5 are compared with brightness values t1, t2, . . . , t5 of the corresponding patches of the pattern edge image, respectively.

Figure 30:
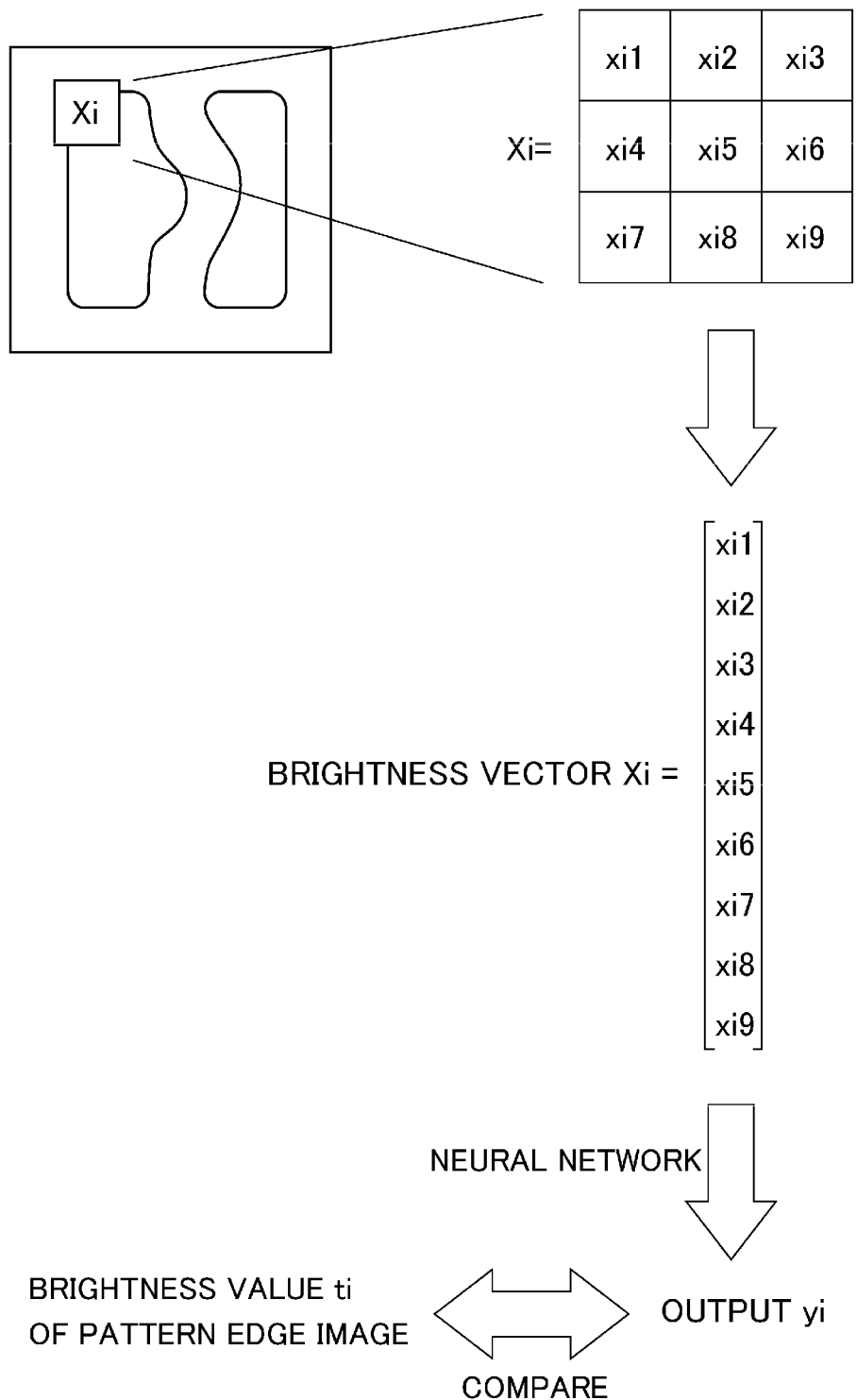
FIG. 30 is a schematic diagram showing patches extracted from the sample image.

FIG. 30 is a schematic diagram showing a patch extracted from the sample image. The patch has a brightness vector including a plurality of brightness values. In the example shown in FIG. 30, the patch has a size of three pixels square. Therefore, the patch has nine pixels, and the brightness values of the respective pixels are represented by xi1, xi2, xi3, xi4, xi5, xi6, xi7, xi8, and xi9. Specifically, the patch is represented by the following brightness vector.

Brightness vector $Xi=[xi1, xi2, xi3, xi4, xi5, xi6, xi7, xi8, xi9]$ where i is the number that identifies the patch.

In one embodiment, an evaluation index for closeness between yi and ti uses a mean squared error, which is defined as $E=\Sigma(yi-ti)^2/N$ where N is the number of patches evaluated at the same time.

When the mean squared error E is small, the output image is expected to be close to the pattern edge image.

The main controller 1 updates the synaptic weights such that the mean squared error E becomes smaller. For example, in a weight parameter $w\alpha\beta$ between a unit $\alpha$ of an M-th layer and a unit $\beta$ of an M+1-st layer, the main controller 1 determines a partial differential value $\partial E/\partial w\alpha\beta$ with respect to $w\alpha\beta$ of E, and uses a gradient method of replacing the parameter $w\alpha\beta$ with $w\alpha\beta-\varepsilon*\partial E/\partial w\alpha\beta$. The symbol $\varepsilon$ is a learning coefficient which is a predetermined numerical value. An Adam method or a stochastic gradient method may be use in order to advance the learning. A backpropagation method is known as an algorithm for efficiently calculating the partial differential $\partial E/\partial w\alpha\beta$ using chain rule of composite function.

Figure 31:
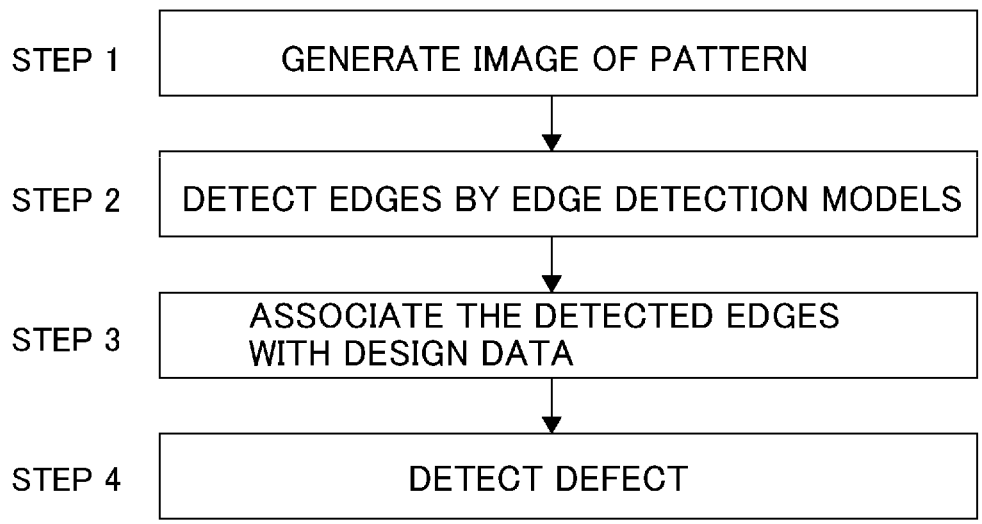
FIG. 31 is a flowchart of edge inspection using edge detection models.

As described above, the synaptic weights are optimized, and the plurality of edge detection models are produced for the plurality of divided edges, respectively. FIG. 31 is a flowchart of the edge inspection using the edge detection models. The edge inspection using the edge detection models is performed by the main controller 1 shown in FIG. 1. The image generating device 7, composed of a scanning electron microscope, generates an image of a pattern (step 1). The main controller 1 obtains the image of the pattern from the image generating device 7. In this embodiment, the pattern is formed on a surface of a wafer which is a specimen. The pattern in the step 1 is different from patterns used to produce the training-data candidates.

In step 2, the main controller 1 applies the plurality of edge detection models for the plurality of divided edges to the image of the pattern to perform the edge detection of the pattern. For example, the main controller 1 detects an upper edge by using the edge detection model for the upper edge, detects a right edge by using the edge detection model for the right edge, detects a left edge by using the edge detection model for the left edge, and detects a lower edge by using the edge detection model for the lower edge. The synaptic weights included in each edge detection model have already been optimized by the learning using the training data. As the edge detection results, a plurality of images of the detected edges are generated. Each image of the detected edge has the same size as the sample image. In each image of the detected edge, numerical value of 1 is assigned to pixels corresponding to the edge, while numerical value of 0 is assigned to pixels that do not correspond to the edge.

Figure 32:
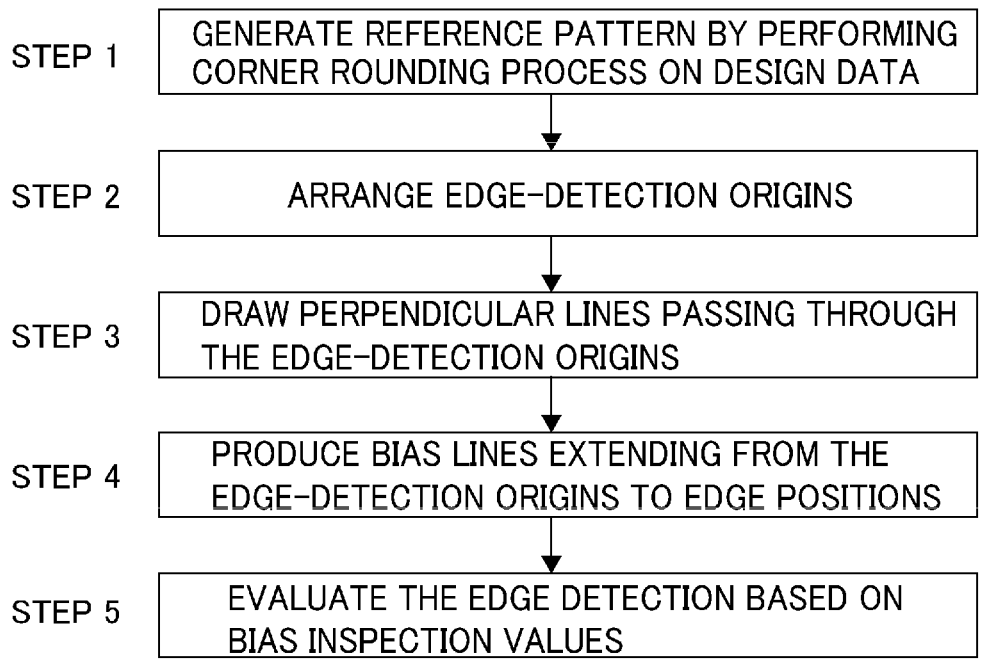
FIG. 32 is a flowchart illustrating steps of associating a plurality of detected edges with design data of a pattern.

In step 3, the detected edges are associated with design data for the pattern whose image has been generated in the step 1. FIG. 32 is a flow chart for explaining the step 3 of FIG. 31. In step 1, the main controller 1 performs the corner rounding process on the design data to generate a reference pattern. Similar to the pattern edge of the training data, the edge of the reference pattern is divided into a plurality of edges according to the pattern edge direction as the edge attribute based on the design data.

Figure 33:
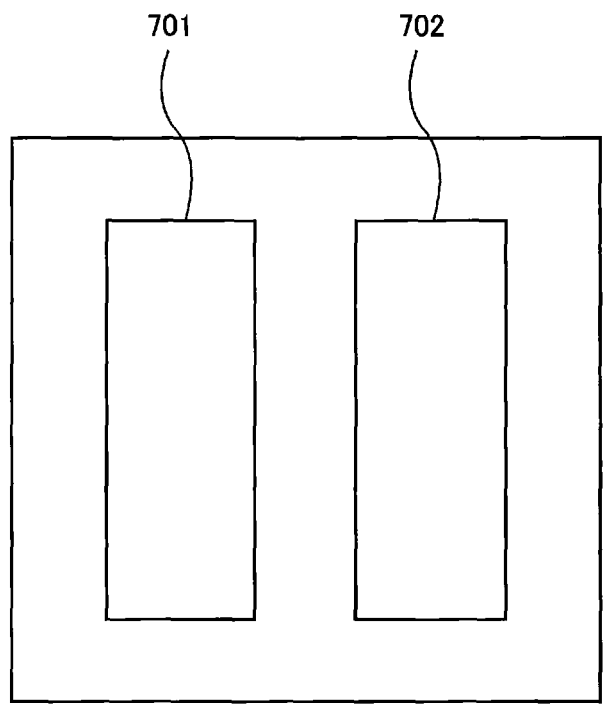
FIG. 33 is a diagram showing design data for pattern.
Figure 34:
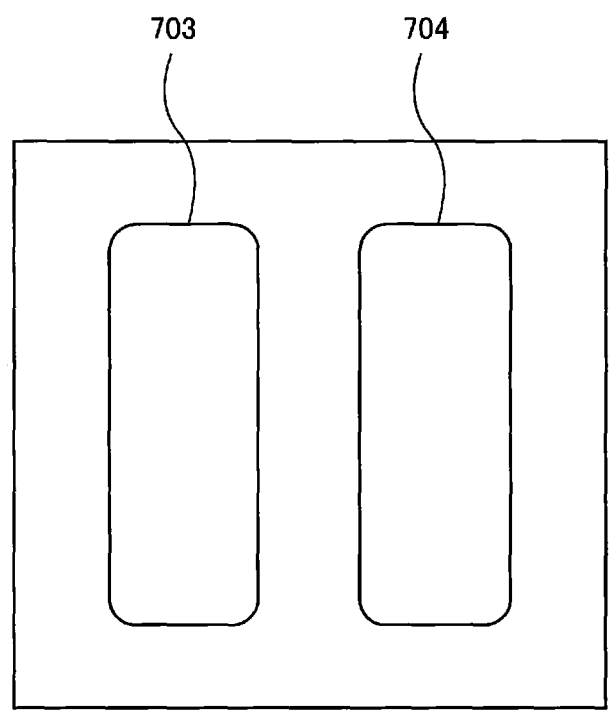
FIG. 34 is a diagram showing reference pattern generated by performing a corner rounding process on the design data shown in FIG. 33.
Figure 35:
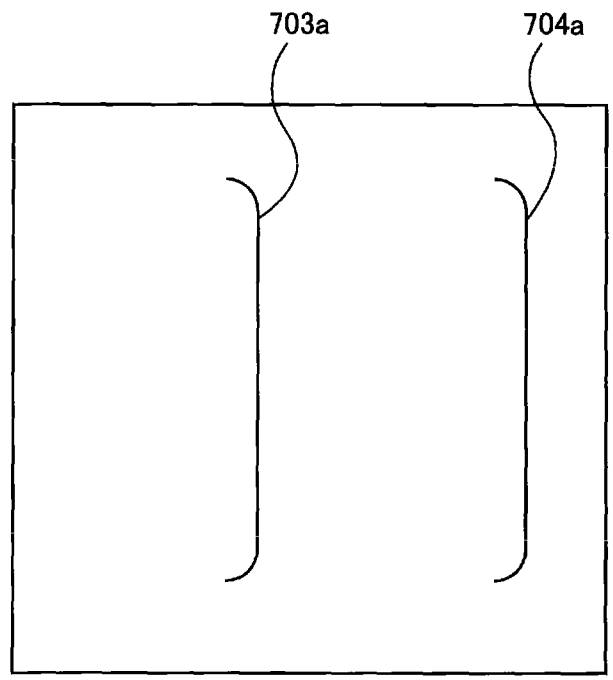
FIG. 35 is a diagram showing a right edge separated from the reference pattern.

FIG. 33 is a diagram showing design data 701 and 702 for patterns, and FIG. 34 is a diagram showing reference patterns 703 and 704 generated by applying the corner rounding process to the design data 701 and 702 shown in FIG. 33. FIG. 35 is a diagram showing right edges 703a and 704a separated from the reference patterns 703 and 704.

Figure 36:
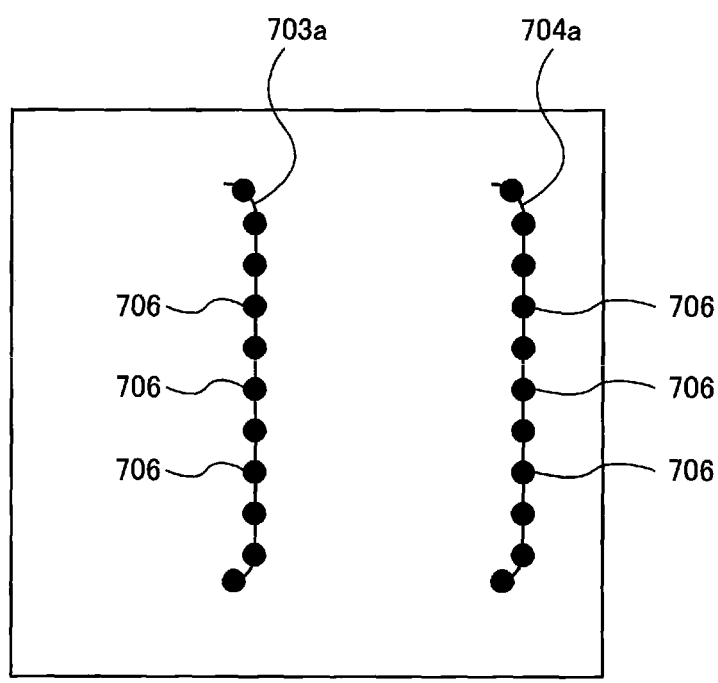
FIG. 36 is a diagram in which edge-detection origins are arranged on the right edge shown in FIG. 35.
Figure 37:
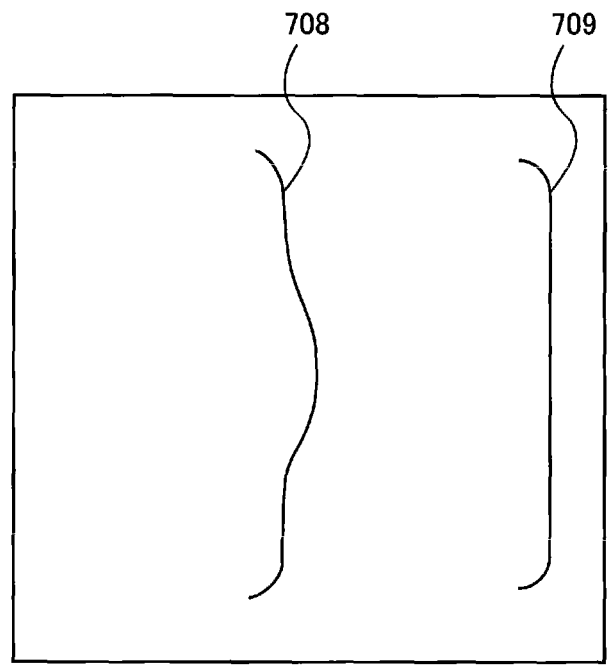
FIG. 37 is a diagram showing a right edge detected in step 2 of FIG. 31.

In step 2 of FIG. 32, the main controller 1 places edge-detection origins on the right edges 703a and 704a shown in FIG. 35. FIG. 36 is a diagram in which the edge-detection origins 706 are arranged on the right edges 703a and 704a shown in FIG. 35. The edge-detection origins 706 are arranged at equal intervals on the right edges 703a and 704a. FIG. 37 is a diagram showing right edges 708 and 709 detected in the step 2 of FIG. 31.

Figure 38:
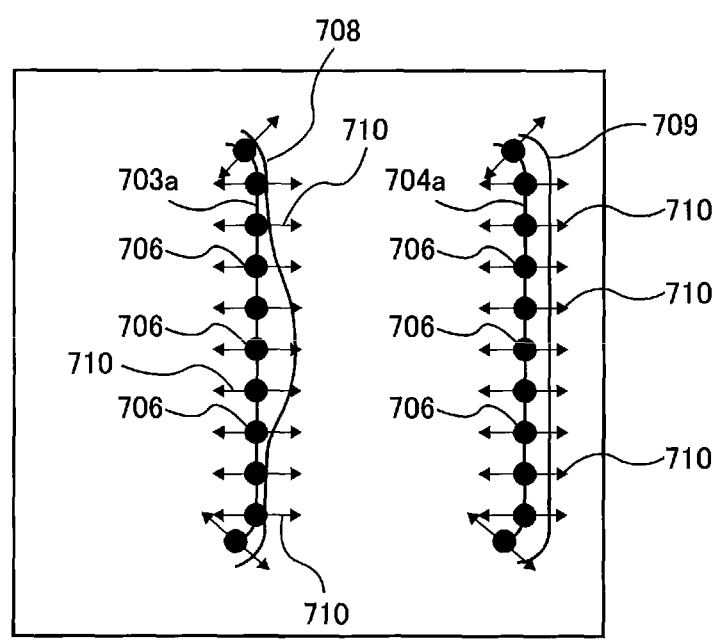
FIG. 38 is a diagram illustrating step 3 of FIG. 32.
Figure 39:
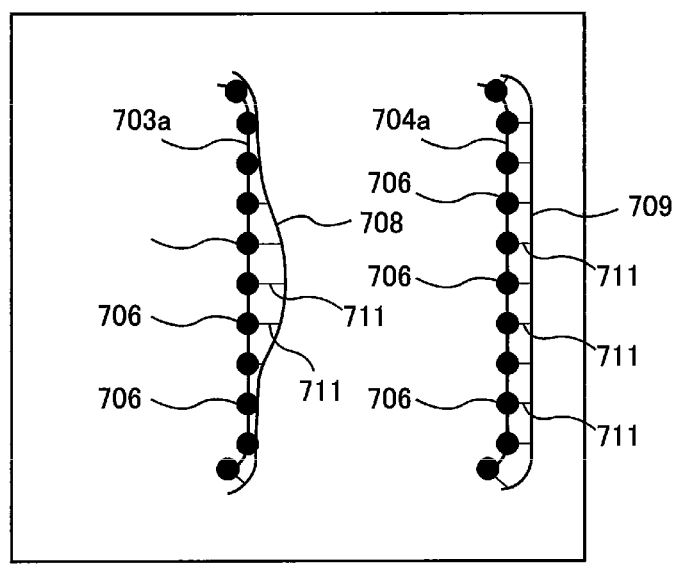
FIG. 39 is a diagram showing bias lines that are line segments extending from the edge-detection origins to edge positions.

FIG. 38 is a diagram for explaining the step 3 in FIG. 32. As shown in FIG. 38, in the step 3 of FIG. 32, the main controller 1 superimposes an image of the right edges 708 and 709, which have been detected using the right-edge detection model, onto an image of the right edges 703a and 704a generated from the design data. The main controller 1 then draws perpendicular lines 710 passing through the edge-detection origins 706. A length of each perpendicular line 710 may be a fixed value, or may be a value specified by an external parameter. The perpendicular lines 710 are drawn to extend toward both the outside and the inside of the right edge 703a and 704a. Intersections of these perpendicular lines 710 and the detected right edges 708 and 709 are edge positions. In step 4 of FIG. 32, the main controller 1 creates bias lines which are line segment extending from the edge-detection origins 706 to the edge positions. FIG. 39 is a diagram showing bias lines 711 which are line segment extending from the edge-detection origins 706 to the edge positions. The right edges 703a and 704a generated from the design data and the right edges 708 and 709 detected by using the edge detection model are associated with each other by the bias lines 711.

Similarly, bias lines are created for upper edges, left edges, and lower edges of the patterns classified by the edge attribute based on the design data, and information of these bias lines is integrated based on the design data, and constitutes die-to-database inspection results.

Returning back to FIG. 31, the main controller 1 performs the defect detection on the wafer patterns based on the lengths of the bias lines, i.e., the bias inspection values, as in the die-to-database inspection without using the machine learning.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention can be used for a pattern edge detection method applicable to a semiconductor inspection device that performs a pattern inspection using pattern design data.

REFERENCE SIGNS LIST 1 main controller
2 storage device
3 input and output controller
4 input device
5 display device
6 printing device
7 image generating device
10 irradiation system
11 electron gun
12 converging lens
13 X deflector
14 Y deflector
15 objective lens
16 lens controller
17 image acquisition device
20 specimen chamber
21 XY stage
22 XY stage controller
30 secondary electron detector
40 wafer transporting device
50 control computer
60 operation computer

The invention claimed is:

1. A method of detecting an edge of a pattern, comprising:
generating an image of a pattern;
detecting an edge of the pattern on the image based on a reference pattern generated from design data for the pattern;
repeating generating of an image of a pattern and detecting of an edge of the pattern on the image to produce training-data candidates including a plurality of images and corresponding pattern edges;
determining training data by removing pattern edges and corresponding images from the training-data candidates, the pattern edges to be removed being pattern edges satisfying a predetermined disqualification condition;
producing an edge detection model by machine learning using the training data;
generating an image of other pattern; and
detecting an edge of the other pattern on the image using the edge detection model,
wherein the predetermined disqualification condition is that a bias inspection value of a pattern edge is larger than a preset upper limit or smaller than a preset lower limit, the bias inspection value being an index value indicative of magnitude and direction of a deviation of the pattern edge from an edge of a reference pattern generated from corresponding design data.

2. A method of detecting an edge of a pattern, comprising:
generating an image of a pattern;
detecting an edge of the pattern on the image based on a reference pattern generated from design data for the pattern;
repeating generating of an image of a pattern and detecting of an edge of the pattern on the image to produce training-data candidates including a plurality of images and corresponding pattern edges;

determining training data by removing pattern edges and corresponding images from the training-data candidates, the pattern edges to be removed being pattern edges satisfying a predetermined disqualification condition;

producing an edge detection model by machine learning using the training data;

generating an image of other pattern; and detecting an edge of the other pattern on the image using the edge detection model, wherein the predetermined disqualification condition is that a bias inspection value of a pattern edge is out of a preset range, the bias inspection value being an index value indicative of magnitude and direction of a deviation of the pattern edge from an edge of a reference pattern generated from corresponding design data.

3. A method of detecting an edge of a pattern, comprising:

generating an image of a pattern;

detecting an edge of the pattern on the image based on a reference pattern generated from design data for the pattern;

repeating generating of an image of a pattern and detecting of an edge of the pattern on the image to produce training-data candidates including a plurality of images and corresponding pattern edges;

determining training data by removing pattern edges and corresponding images from the training-data candidates, the pattern edges to be removed being pattern edges satisfying a predetermined disqualification condition;

producing an edge detection model by machine learning using the training data;

generating an image of other pattern; and detecting an edge of the other pattern on the image using the edge detection model, wherein the predetermined disqualification condition is that a bias inspection value of a pattern edge varies discontinuously, the bias inspection value being an index value indicative of magnitude and direction of a deviation of the pattern edge from an edge of a reference pattern generated from corresponding design data.

4. A method of detecting an edge of a pattern, comprising:

generating an image of a pattern;

detecting an edge of the pattern on the image based on a reference pattern generated from design data for the pattern;

repeating generating of an image of a pattern and detecting of an edge of the pattern on the image to produce training-data candidates including a plurality of images and corresponding pattern edges;

determining training data by removing pattern edges and corresponding images from the training-data candidates, the pattern edges to be removed being pattern edges satisfying a predetermined disqualification condition;

producing an edge detection model by machine learning using the training data;

generating an image of other pattern; and detecting an edge of the other pattern on the image using the edge detection model, wherein the predetermined disqualification condition is that a bias inspection value of a pattern edge is out of a preset range and that the bias inspection value varies discontinuously, the bias inspection value being an index value indicative of magnitude and direction of a deviation of the pattern edge from an edge of a reference pattern generated from corresponding design data.

5. A method of detecting an edge of a pattern, comprising:

generating an image of a pattern;

detecting an edge of the pattern on the image based on a reference pattern generated from design data for the pattern;

repeating generating of an image of a pattern and detecting of an edge of the pattern on the image to produce training-data candidates including a plurality of images and corresponding pattern edges;

classifying the plurality of images included in the training-data candidates into a plurality of image groups according to pattern type;

removing images from the training-data candidates such that the numbers of images belonging to the respective image groups are the same;

determining training data by removing pattern edges and corresponding images from the training-data candidates, the pattern edges to be removed being pattern edges satisfying a predetermined disqualification condition;

producing an edge detection model by machine learning using the training data;

generating an image of other pattern; and detecting an edge of the other pattern on the image using the edge detection model.

6. A method of detecting an edge of a pattern, comprising:

generating an image of a pattern;

detecting an edge of the pattern on the image based on a reference pattern generated from design data for the pattern;

repeating generating of an image of a pattern and detecting of an edge of the pattern on the image to produce training data including a plurality of images and corresponding pattern edges;

producing edge detection models by machine learning using the training data, wherein producing the edge detection modes by the machine learning comprises (i) dividing each of the pattern edges included in the training data into a plurality of edges according to edge attribute based on the design data, and (ii) producing the edge detection models respectively for the plurality of edges by the machine learning using the training data;

generating an image of other pattern; and detecting an edge of the other pattern on the image using the edge detection models.

7. The method according to claim 6, wherein detecting the edge of the other pattern on the image comprises:

detecting edges of the other pattern on the image using the edge detection models, respectively; and associating the detected edges with design data of the other pattern.

* * * * *